US012608948B2

(12) United States Patent
Li et al.

(10) Patent No.: US 12,608,948 B2
(45) Date of Patent: Apr. 21, 2026

(54) METHOD FOR TRAINING AUTONOMOUS DRIVING MODEL, ELECTRONIC DEVICE, AND STORAGE MEDIUM

(71) Applicant: Shanghai Artificial Intelligence Innovation Center, Shanghai (CN)

(72) Inventors: Hongyang Li, Shanghai (CN); Li Chen, Shanghai (CN); Shenyuan Gao, Shanghai (CN); Jiazhi Yang, Shanghai (CN); Yihang Qiu, Shanghai (CN); Chonghao Sima, Shanghai (CN); Tianyu Li, Shanghai (CN); Jia Zeng, Shanghai (CN); Yang Li, Shanghai (CN); Huijie Wang, Shanghai (CN); Junchi Yan, Shanghai (CN); Ping Luo, Shanghai (CN); Yu Qiao, Shanghai (CN)

(73) Assignee: Shanghai Artificial Intelligence Innovation Center, Shanghai (CN)

( * ) Notice: Subject to any disclaimer, the term of this patent is extended or adjusted under 35 U.S.C. 154(b) by 0 days.

(21) Appl. No.: 18/936,908

(22) Filed: Nov. 4, 2024

(65) Prior Publication Data

US 2025/0200983 A1 Jun. 19, 2025

Related U.S. Application Data

(63) Continuation of application No. 18/888,671, filed on Sep. 18, 2024.

(30) Foreign Application Priority Data

Dec. 15, 2023 (CN) .......................... 202311735181.8
Dec. 25, 2023 (CN) .......................... 202311796343.9

(51) Int. Cl.
| | |
|---|---|
| *G06V 20/56* | (2022.01) |
| *G06T 5/70* | (2024.01) |
| *G06T 7/20* | (2017.01) |

(52) U.S. Cl.
CPC ................ *G06V 20/56* (2022.01); *G06T 5/70* (2024.01); *G06T 7/20* (2013.01);
(Continued)

(58) Field of Classification Search
None
See application file for complete search history.

(56) References Cited

U.S. PATENT DOCUMENTS

2020/0104638 A1* 4/2020 Huang ................ G06F 18/2178
2020/0285951 A1* 9/2020 Kim .......................... G06N 3/09
(Continued)

FOREIGN PATENT DOCUMENTS

CN 108803617 A 11/2018
CN 112465278 A 3/2021
(Continued)

OTHER PUBLICATIONS

Translation for CN 113221613 (Year: 2021).*
(Continued)

*Primary Examiner* — Ricky Chin
(74) *Attorney, Agent, or Firm* — Wood, Phillips, Katz, Clark & Mortimer

(57) ABSTRACT

Provided method for training an autonomous driving model including a video prediction model, and the method including: determining, according to at least one of an initial video frame collected by a target vehicle or scenario description metadata of an initial video frame, a scenario context of the initial video frame; determining a vehicle movement instruction of the target vehicle according to at least one of the initial video frame or trajectory data of the target vehicle
(Continued)

corresponding to the initial video frame; and training an initial model using the initial video frame and a control text corresponding to the initial video frame, to obtain the video prediction model, where the control text comprises the scenario context and the vehicle movement instruction, and the video prediction model is configured to output a predicted video frame.

20 Claims, 8 Drawing Sheets

(52) U.S. Cl.
CPC ............... *G06T 2207/20081* (2013.01); *G06T 2207/20084* (2013.01); *G06T 2207/30241* (2013.01); *G06T 2207/30252* (2013.01)

(56) References Cited

U.S. PATENT DOCUMENTS

| | | | | |
|---|---|---|---|---|
| 2023/0230484 | A1* | 7/2023 | Al Faruque | G06V 20/56 |
| 2024/0152767 | A1* | 5/2024 | Baikampady Gopalkrishna | G06N 3/047 |
| 2024/0166223 | A1* | 5/2024 | Esna Ashari Esfahani | B60W 50/0205 |
| 2024/0282196 | A1* | 8/2024 | Nagatsuka | G08G 1/16 |
| 2024/0317252 | A1* | 9/2024 | Chilton | B60K 35/00 |
| 2024/0403337 | A1* | 12/2024 | Mishima | G06F 16/3329 |
| 2025/0200983 | A1* | 6/2025 | Li | G06V 20/44 |

FOREIGN PATENT DOCUMENTS

| | | | | | |
|---|---|---|---|---|---|
| CN | 113221613 | A | * | 8/2021 | ............. G06N 3/044 |
| CN | 115167446 | A | | 10/2022 | |
| CN | 115221369 | A | * | 10/2022 | ....... G06F 16/90332 |
| CN | 115249323 | A | * | 10/2022 | ....... G06F 16/90332 |
| CN | 115599954 | A | * | 1/2023 | |
| CN | 116383354 | A | * | 7/2023 | ......... G06F 16/3329 |
| CN | 116595133 | A | * | 8/2023 | ......... G06F 16/3329 |
| CN | 116804999 | A | * | 9/2023 | |
| CN | 116958652 | A | * | 10/2023 | .......... G06V 10/765 |
| CN | 117104275 | A | | 11/2023 | |
| CN | 117173715 | A | * | 12/2023 | |
| WO | 2020221278 | A | | 11/2020 | |
| WO | WO-2023192278 | A1 | * | 10/2023 | ............. G06F 3/011 |

OTHER PUBLICATIONS

Notice to Grant for Chinese Patent Application No. 202311735181.8 mailed May 7, 2025.

Notice to Grant for Chinese Patent Application No. 202311796343.9 mailed May 23, 2025.

Quian et al., "NuScenes-QA: A Multi-Modal Visual Question Answering Benchmark for Autonomous Driving Scenario", The Thirty-Eighth AAAI Conference on Artificial Intelligence (AAAI-24), p. 4542-4550.

Sima et al., "DriveLM: Driving with Graph Visual Question Answering", at https://github.com/OpenDriveLab/DriveLM.

Song et al., "GVQA: Learning to Answer Questions about Graphs with Visulaizations via Knowledge Base", Proceedings of the 2023 CHI Conference on Human Factors in.

* cited by examiner

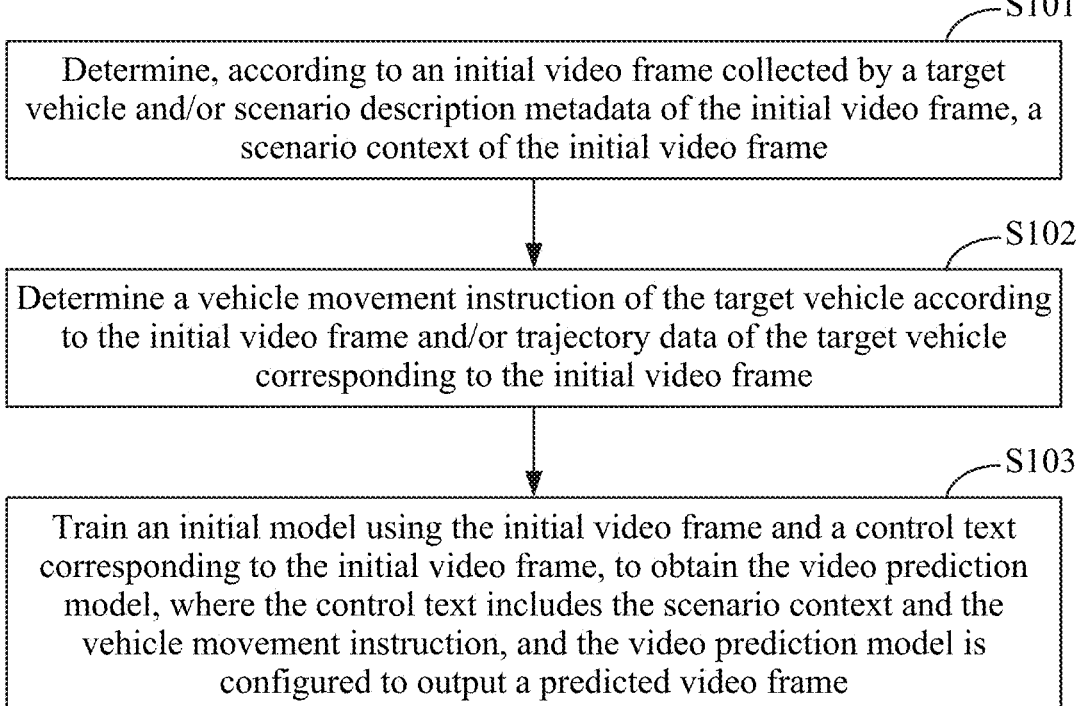

S101

Determine, according to an initial video frame collected by a target vehicle and/or scenario description metadata of the initial video frame, a scenario context of the initial video frame

S102

Determine a vehicle movement instruction of the target vehicle according to the initial video frame and/or trajectory data of the target vehicle corresponding to the initial video frame

S103

Train an initial model using the initial video frame and a control text corresponding to the initial video frame, to obtain the video prediction model, where the control text includes the scenario context and the vehicle movement instruction, and the video prediction model is configured to output a predicted video frame

FIG. 3

```
┌──────────┐   ┌──────────────┐   ┌──────────────┐   ┌──────┐   ┌──────────────┐
│ Initial  │   │  BLIP-2 and  │   │   Scenario   │   │      │   │   Scenario    │
│  video   │──▶│    camera    │──▶│ context and  │◀──│ GPT  │◀──│ description   │
│  frame   │   │   behavior   │   │   vehicle    │   │      │   │  metadata     │
│          │   │classification│   │   movement   │   │      │   │     and       │
│          │   │    model     │   │ instruction  │   │      │   │  trajectory   │
└──────────┘   └──────────────┘   └──────────────┘   └──────┘   │     data      │
                                                                 └──────────────┘
```

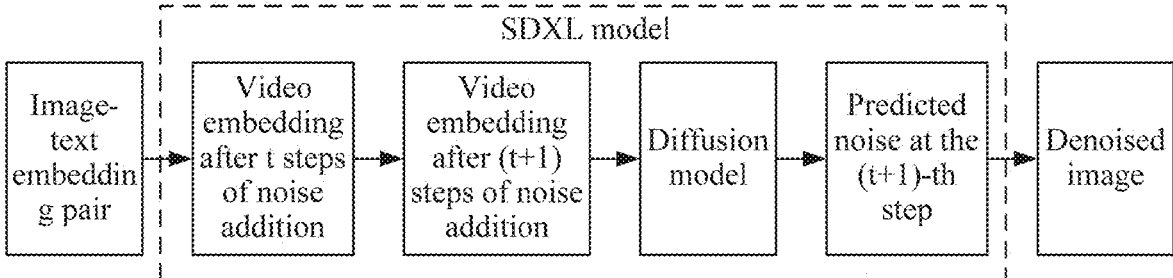

FIG. 4

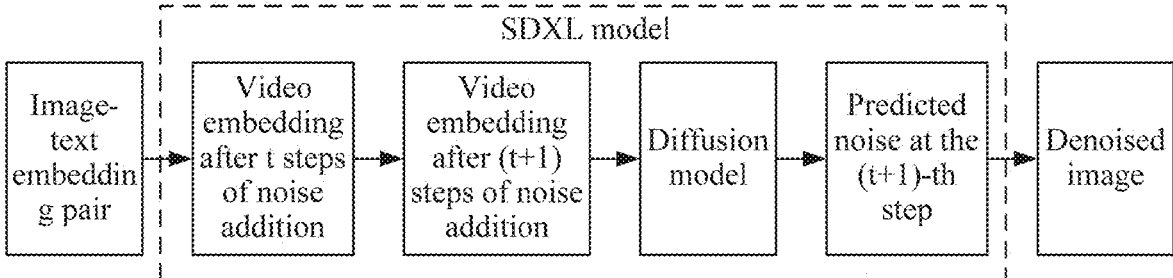

```
┌──────────┐  ┌ ─ ─ ─ ─ ─ ─ ─ ─ ─ ─ ─ ─ ─ SDXL model ─ ─ ─ ─ ─ ─ ─ ─ ─ ─ ─ ─ ─ ┐
│ Image-   │    ┌──────────┐  ┌──────────┐  ┌─────────┐  ┌──────────┐              ┌──────────┐
│ text     │  │ │  Video   │  │  Video   │  │         │  │Predicted │ │            │          │
│embeddin  │──▶  │embedding │─▶│embedding │─▶│Diffusion│─▶│noise at  │──────────────▶│Denoised │
│ g pair   │  │ │after t   │  │after (t+1)│ │ model   │  │the (t+1) │ │            │  image   │
│          │    │steps of  │  │steps of  │  │         │  │ -th step │              │          │
│          │  │ │noise     │  │noise     │  │         │  │          │ │            │          │
│          │    │addition  │  │addition  │  │         │  │          │              │          │
└──────────┘  │ └──────────┘  └──────────┘  └─────────┘  └──────────┘ │            └──────────┘
               ─ ─ ─ ─ ─ ─ ─ ─ ─ ─ ─ ─ ─ ─ ─ ─ ─ ─ ─ ─ ─ ─ ─ ─ ─ ─ ─
```

FIG. 5

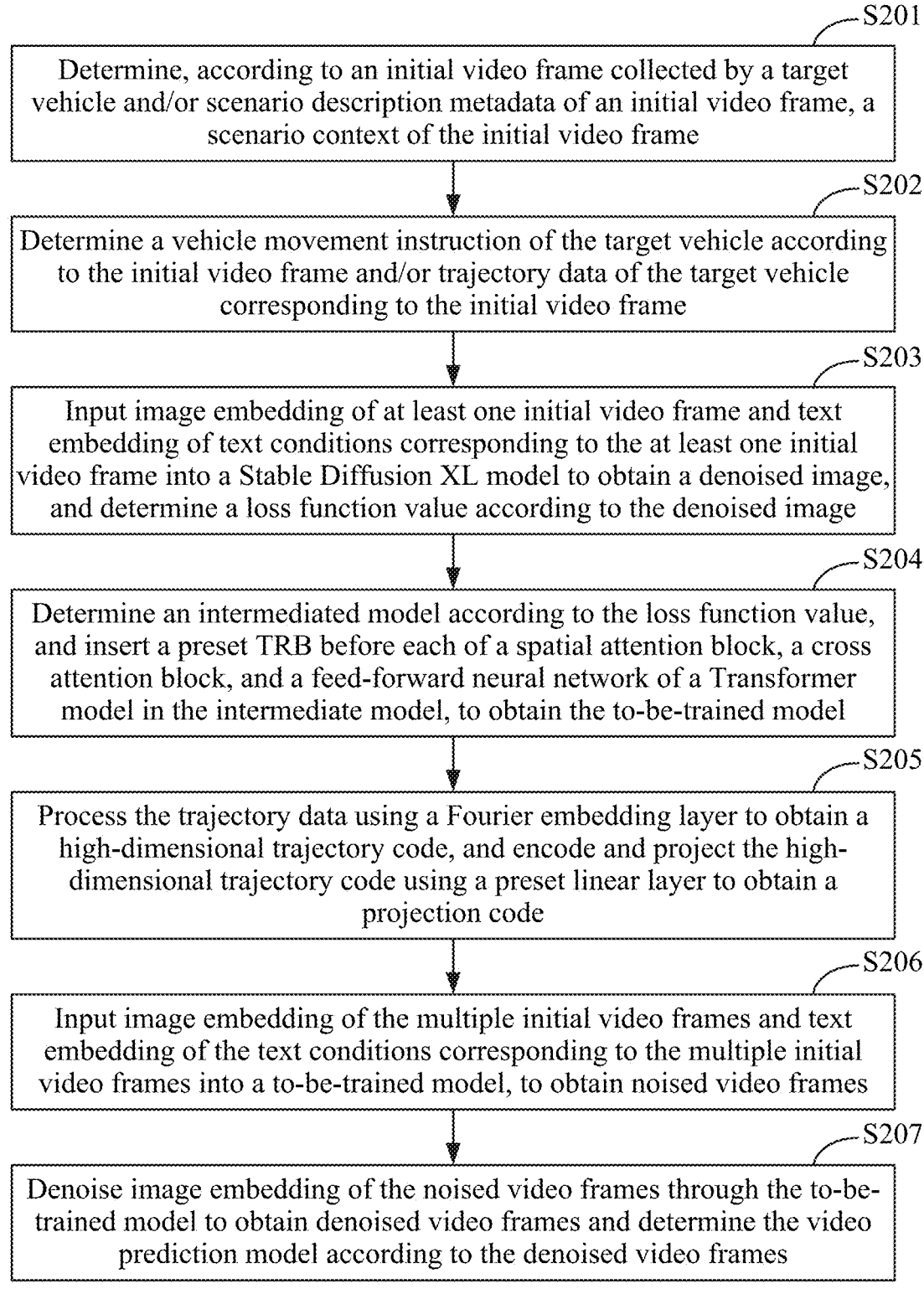

S201

Determine, according to an initial video frame collected by a target vehicle and/or scenario description metadata of an initial video frame, a scenario context of the initial video frame

S202

Determine a vehicle movement instruction of the target vehicle according to the initial video frame and/or trajectory data of the target vehicle corresponding to the initial video frame

S203

Input image embedding of at least one initial video frame and text embedding of text conditions corresponding to the at least one initial video frame into a Stable Diffusion XL model to obtain a denoised image, and determine a loss function value according to the denoised image

S204

Determine an intermediated model according to the loss function value, and insert a preset TRB before each of a spatial attention block, a cross attention block, and a feed-forward neural network of a Transformer model in the intermediate model, to obtain the to-be-trained model

S205

Process the trajectory data using a Fourier embedding layer to obtain a high-dimensional trajectory code, and encode and project the high-dimensional trajectory code using a preset linear layer to obtain a projection code

S206

Input image embedding of the multiple initial video frames and text embedding of the text conditions corresponding to the multiple initial video frames into a to-be-trained model, to obtain noised video frames

S207

Denoise image embedding of the noised video frames through the to-be-trained model to obtain denoised video frames and determine the video prediction model according to the denoised video frames

FIG. 6

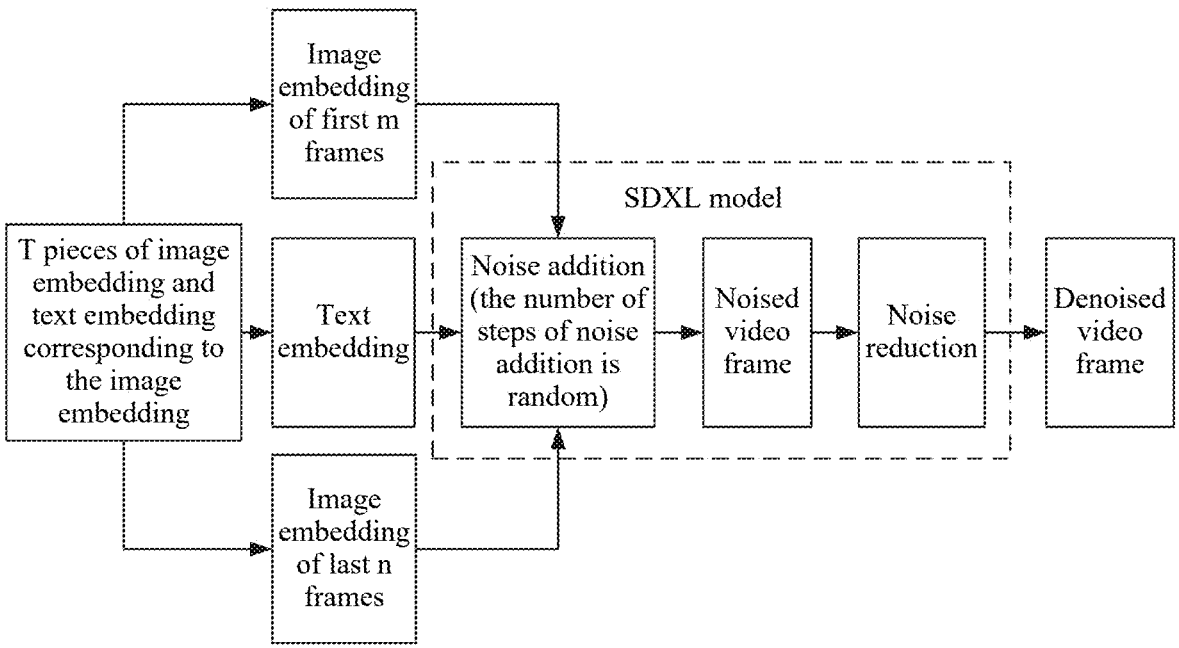

Acquire at least one conditional video frame, a target scenario context, and a target movement instruction of a current vehicle, where the target scenario context is a scenario context of a current scenario corresponding to the conditional video frame

~S302

Input image embedding of the at least one conditional video frame and text embedding of text conditions into a preset video prediction model to obtain a predicted video, where the preset video prediction model is obtained by using the method for training an autonomous driving model including a video prediction model, and the text conditions includes the target scenario context and/or the target movement instruction

FIG. 10

METHOD FOR TRAINING AUTONOMOUS DRIVING MODEL, ELECTRONIC DEVICE, AND STORAGE MEDIUM

CROSS-REFERENCE TO RELATED APPLICATION(S)

This is a continuation of U.S. patent application Ser. No. 18/888,671, filed on Sep. 18, 2024 which claims priority to Chinese Patent Application No. 202311735181.8 filed Dec. 15, 2023 and Chinese Patent Application No. 202311796343.9 filed Dec. 25, 2023, the disclosures of which are incorporated herein by reference in their entireties.

TECHNICAL FIELD

The present disclosure relates to the field of autonomous driving technologies and, in particular, to a method for training an autonomous driving model, a method for predicting an autonomous driving video, an electronic device, and a storage medium.

BACKGROUND

Insufficient generalization has always been a major problem in the field of autonomous driving. The model trained with a relatively single and simple data set cannot generalize well in complex scenarios in the real world, leading to many safety hazards and seriously hindering the implementation of autonomous driving. Therefore, it is particularly important to improve generalization in the field of autonomous driving.

SUMMARY

In a first aspect, an embodiment of the present application provides a method for training an autonomous driving model. The autonomous driving model includes a driving behavior prediction model and a driving trajectory prediction model. The method for training the autonomous driving model includes constructing a visual question answering (VQA) network graph based on an autonomous driving data set and/or an autonomous driving simulator, where the VQA network graph includes an image frame and a QA network graph corresponding to the image frame, the QA network graph is composed of multiple nodes and directed edges among the multiple nodes, and each of the multiple nodes carries a question and answer (Q&A) pair; using the VQA network graph as a sample set and dividing the sample set into a training set and a test set; and training the driving behavior prediction model and the driving trajectory prediction model based on the training set and evaluating the driving behavior prediction model and the driving trajectory prediction model based on the test set.

In a second aspect, an embodiment of the present application provides a method for training an autonomous driving model. The autonomous driving model includes a video prediction model. The method includes using an initial video frame collected by a target vehicle and/or scenario description metadata of the initial video frame to determine a scenario context of the initial video frame; determining a vehicle movement instruction of the target vehicle using the initial video frame and/or trajectory data of the target vehicle corresponding to the initial video frame; and training an initial model using the initial video frame and a control text corresponding to the initial video frame, to obtain a video prediction model, where the control text includes the scenario context and the vehicle movement instruction, and the video prediction model is configured to output a predicted video frame.

In a third aspect, an embodiment of the present application provides a method for predicting an autonomous driving video. The method includes acquiring at least one conditional video frame, a target scenario context, and a target movement instruction of a current vehicle, where the target scenario context is a scenario context of a current scenario corresponding to a conditional video frame of the at least one conditional video frame; and inputting image embedding of the at least one conditional video frame and text embedding of text conditions into a preset video prediction model to obtain a predicted video, where the preset video prediction model is obtained by using the method for training an autonomous driving model in the second aspect, and the text conditions include the target scenario context and/or the target movement instruction.

In a fourth aspect, an embodiment of the present application provides an electronic device. The electronic device includes at least one processor; and a memory communicatively connected to the at least one processor. The memory stores a computer program executable by the at least one processor to cause the at least one processor to perform the method for training an autonomous driving model. The autonomous driving model includes a driving behavior prediction model and a driving trajectory prediction model. The method for training an autonomous driving model includes constructing a VQA network graph based on an autonomous driving data set and/or an autonomous driving simulator, where the VQA network graph includes an image frame and a QA network graph corresponding to the image frame, the QA network graph is composed of multiple nodes and directed edges among the multiple nodes, and each of the multiple nodes carries a Q&A pair; using the VQA network graph as a sample set and dividing the sample set into a training set and a test set; and training the driving behavior prediction model and the driving trajectory prediction model based on the training set and evaluating the driving behavior prediction model and the driving trajectory prediction model based on the test set.

In a fifth aspect, an embodiment of the present application provides an electronic device. The electronic device includes at least one processor; and a memory communicatively connected to the at least one processor. The memory stores a computer program executable by the at least one processor to cause the at least one processor to perform the method for training an autonomous driving model. The autonomous driving model includes a video prediction model. The method for training an autonomous driving model includes determining, according to an initial video frame collected by a target vehicle and/or scenario description metadata of the initial video frame, a scenario context of the initial video frame; determining a vehicle movement instruction of the target vehicle using the initial video frame and/or trajectory data of the target vehicle corresponding to the initial video frame; and training an initial model using the initial video frame and a control text corresponding to the initial video frame, to obtain the video prediction model, where the control text includes the scenario context and the vehicle movement instruction, and the video prediction model is configured to output a predicted video frame.

In a sixth aspect, an embodiment of the present application provides a non-transitory computer-readable storage medium storing computer instructions. The computer instructions, when executed by a processor, cause the processor to perform the method for training an autonomous driving model. The autonomous driving model includes a driving behavior prediction model and a driving trajectory prediction model. The method for training an autonomous driving model includes constructing a VQA network graph based on an autonomous driving data set and/or an autonomous driving simulator, where the VQA network graph includes an image frame and a QA network graph corresponding to the image frame, the QA network graph is composed of multiple nodes and directed edges among the multiple nodes, and each of the multiple nodes carries a Q&A pair; using the VQA network graph as a sample set and dividing the sample set into a training set and a test set; and training the driving behavior prediction model and the driving trajectory prediction model based on the training set and evaluating the driving behavior prediction model and the driving trajectory prediction model based on the test set.

In a seventh aspect, an embodiment of the present application provides a non-transitory computer-readable storage medium storing computer instructions. The computer instructions, when executed by a processor, cause the processor to perform the method for training an autonomous driving model. The autonomous driving model includes a video prediction model. The method for training an autonomous driving model includes determining, according to an initial video frame collected by a target vehicle and/or scenario description metadata of the initial video frame, a scenario context of the initial video frame; determining a vehicle movement instruction of the target vehicle using the initial video frame and/or trajectory data of the target vehicle corresponding to the initial video frame; and training an initial model using the initial video frame and a control text corresponding to the initial video frame, to obtain the video prediction model, where the control text includes the scenario context and the vehicle movement instruction, and the video prediction model is configured to output a predicted video frame.

BRIEF DESCRIPTION OF DRAWINGS

FIG. 3 is a flowchart of a method for training an autonomous driving model according to embodiment two of the present disclosure.

FIG. 4 is a flowchart of generating control texts according to embodiment two of the present disclosure.

FIG. 5 is a schematic diagram of training a first-stage model according to embodiment two of the present disclosure.

FIG. 6 is a flowchart of a method for training an autonomous driving model according to embodiment three of the present disclosure.

FIG. 9 is a schematic diagram of training a second-stage model according to embodiment three of the present disclosure.

FIG. 10 is a flowchart of a video prediction method according to embodiment four of the present disclosure.

DETAILED DESCRIPTION

Figure 1:
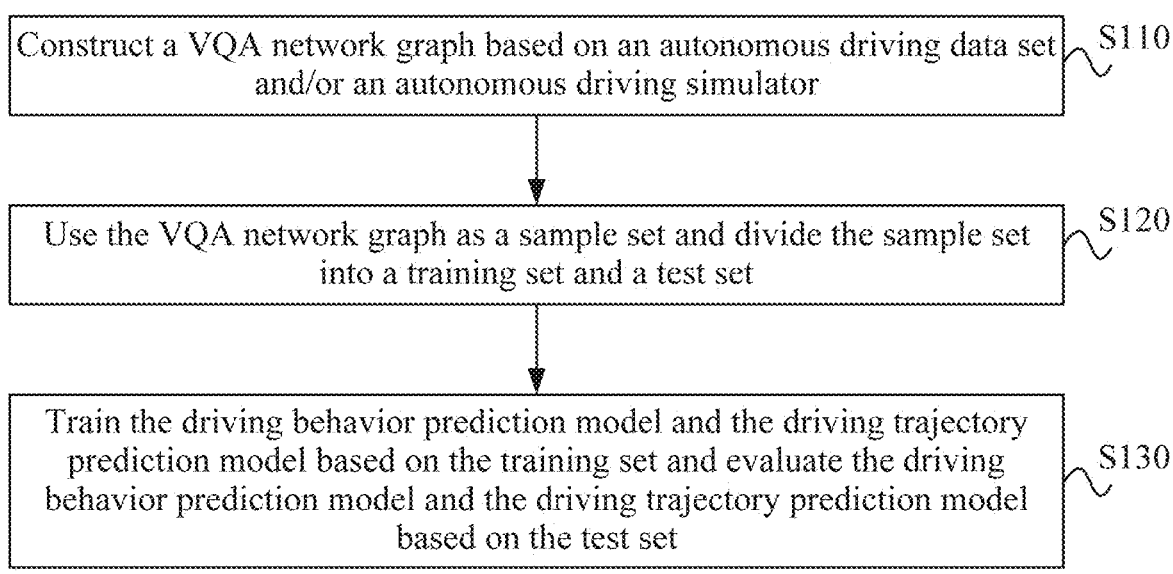
FIG. 1 is a flowchart of a method for training an autonomous driving model according to embodiment one of the present disclosure.

The present disclosure is described hereinafter in detail in conjunction with drawings and embodiments. It is to be understood that the embodiments described herein are intended to explain the present disclosure and not to limit the present disclosure. Additionally, it is to be noted that for ease of description, only part, not all, of the structures related to the present disclosure are illustrated in the drawings.

It is to be noted that the terms "first", "second", and the like in the description, claims, and drawings of the present disclosure are used for distinguishing between similar objects and are not necessarily used for describing a particular order or sequence. It is to be understood that the data used in this manner is interchangeable in appropriate cases so that the embodiments of the present disclosure described herein may be implemented in a sequence not illustrated or described herein. In the description of the present disclosure, unless otherwise noted, "a plurality of" means two or more. "And/or" is used for describing an association between associated objects and indicates three relations. For example, "A and/or B" may indicate the presence of A alone, the presence of both A and B, and the presence of B alone. The character "/" generally indicates an "or" relation between associated objects. Additionally, terms "including" and "having" as well as any variations thereof are intended to encompass a non-exclusive inclusion. For example, a process, method, system, product, or device that includes a series of steps or units not only includes the expressly listed steps or units but may also include other steps or units that are not expressly listed or are inherent to such a process, method, product, or device.

Trajectory planning is the core technology of the autonomous driving system. Currently, a large number of neural network models are used for trajectory planning in the field of autonomous driving. However, insufficient generalization has always been a major problem faced by the field of autonomous driving. The model trained with a relatively single and simple data set cannot generalize well in complex scenarios in the real world, leading to many safety hazards and seriously hindering the implementation of autonomous driving. At the same time, autonomous driving models also require a certain degree of interactivity.

Embodiment One

FIG. 1 is a flowchart of a method for training an autonomous driving model according to embodiment one of the present disclosure. This embodiment may be applied to the case of training an autonomous driving model. The method may be performed by an apparatus for training an autonomous driving model. The apparatus may be implemented in the form of software and/or hardware. In an embodiment, the apparatus is implemented by an electronic device, and the electronic device may be a mobile terminal, a personal computer (PC), or a server.

In this embodiment, the autonomous driving model includes a driving behavior prediction model and a driving trajectory prediction model. The driving behavior prediction model is configured to predict the driving behavior of the vehicle, and the driving behavior may include the driving speed and/or the steering angle. The driving trajectory prediction model is configured to predict the driving trajectory of the vehicle in the next n seconds, and the driving trajectory may be represented by the position coordinates of multiple trajectory points.

As shown in FIG. 1, the method for training an autonomous driving model includes steps S110 to S130 below.

In S110, a VQA network graph is constructed based on an autonomous driving data set and/or an autonomous driving simulator.

The VQA network graph includes an image frame and a QA network graph corresponding to the image frame, the QA network graph is composed of multiple nodes and directed edges among the multiple nodes, and each node carries a Q&A pair. Each node (may be referred to as a QA node) corresponds to a reasoning stage. If a directed edge exists between two nodes, it indicates that a logical dependency exists between the reasoning stages corresponding to the two nodes.

The reasoning stage may include at least one of a perception stage, a prediction stage, or a planning stage. Perception may be understood as identifying, describing, and locating an object in the current driving scenario; prediction may be understood as estimating a possible action or interaction of the object based on a perception result; and planning may be understood as the possible safety action of the vehicle.

Figure 2:
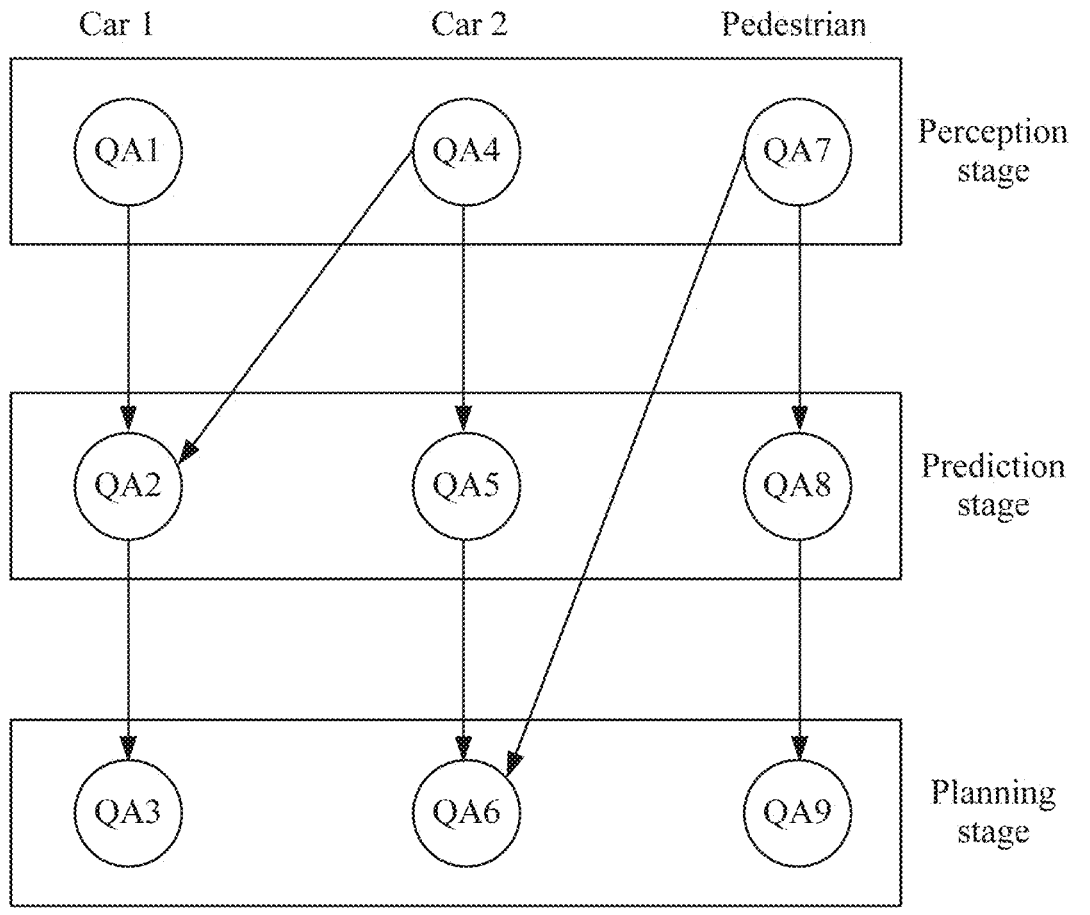
FIG. 2 illustrates a schematic QA network graph according to embodiment one of the present disclosure.

In this embodiment, the directed edge may correspond to the logical dependency in two dimensions, which are an object-level dimension and a task-level dimension. In the object-level dimension, the interaction between different objects may be represented by the directed edge. For example, FIG. 2 illustrates a schematic QA network graph according to embodiment one of the present disclosure. As shown in FIG. 2, a directed edge exists between a planning node (QA6) of car 2 and a perception node (QA7) of a pedestrian, indicating that the planning node of car 2 is affected by the perception node of the pedestrian. In the task-level dimension, the directed edge is configured to represent the logical progressive relationship of different reasoning stages. As shown in FIG. 2, it progresses from the perception stage to the prediction stage and from the prediction stage to the planning stage.

The autonomous driving data set may be an open source data set used in the field of autonomous driving, such as the nuScenes data set. The autonomous driving simulator may be an open source tool for simulating autonomous driving, such as the CARLA simulator.

In this embodiment, constructing the VQA network graph based on the autonomous driving data set may be as follows: extracting a key frame from a driving video of the autonomous driving data set; extracting at least one key object from the key frame; adding multiple Q&A pairs in the reasoning stage for each key object; and adding the directed edges among the multiple Q&A pairs based on logical dependencies among the multiple Q&A pairs to obtain the QA network graph corresponding to the key frame and adding a two-dimensional (2D) bounding box for a key object of the at least one key object in the key frame.

The reasoning stage includes at least one of the perception stage, the prediction stage, or the planning stage. For a detailed description of each reasoning stage, reference is made to the preceding embodiments, and the details are not repeated here. The driving video may be collected by a camera disposed on the vehicle. The autonomous driving data set includes a large number of driving videos, from which a certain number of driving videos may be selected for use in the solution of this embodiment. The key object may be another driving object in the key frame that may affect the driving decision of the vehicle, such as a vehicle or a pedestrian. In an embodiment, extracting the key frame from the driving video of the autonomous driving data set may be as follows: inputting the driving video into a pre-trained key frame extraction neural network model to output the key frame included in the driving video; or filtering out, by an annotator, the key frame from the driving video. In an embodiment, extracting at least one key object from the key frame may be as follows: inputting the key frame into a pre-trained key extraction neural network model; or extracting, by the annotator, the key object from the key frame.

Each key object may have one or more Q&A pairs in the reasoning stages, that is, each key object includes Q&A pairs in the perception stage, the prediction stage, and the planning stage. In an embodiment, adding multiple Q&A pairs in the reasoning stage to each key object may be as follows: for the Q&A pairs in the perception stage, part of them may be generated based on driving-related data in the autonomous driving data set, and the other part of them may be manually annotated by the annotator; and the Q&A pairs in the prediction stage and the planning stage are manually annotated by the annotator.

Adding the directed edges among the multiple Q&A pairs based on the logical dependencies among the multiple Q&A pairs may be as follows: establishing the logical dependency among the Q&A pairs according to the requirements to add the directed edges among the Q&A pairs according to the logical dependencies to obtain the QA network graph corresponding to the key frame. Adding the 2D bounding box to the key object in the key frame may be as follows: framing the key object in the key frame using the 2D bounding box and annotating the position information of the 2D bounding box. The position information of the 2D bounding box may be represented by the position coordinates of the two vertices on the diagonal. That is, the key frame with the 2D bounding box is used as the image frame in the VQA network graph. In an embodiment, a scenario-level description may be added for each key frame, and the scenario-level description explains the behavior of the vehicle in the entire driving video.

In this embodiment, constructing the VQA network graph based on the autonomous driving simulator includes creating a virtual vehicle and a virtual scenario based on the autonomous driving simulator; controlling the virtual vehicle to drive in the virtual scenario and collecting driving-related data of the virtual vehicle during driving; based on the driving-related data, constructing multiple Q&A pairs in the reasoning stage corresponding to the image frame; and adding the directed edges among the Q&A pairs based on a logical dependency between the Q&A pairs to obtain the QA network graph corresponding to the image frame.

The driving-related data may be collected by a sensor disposed on the autonomous driving simulator and includes semantic segmentation, a depth map, lidar point cloud data, and the like.

In this embodiment, the autonomous driving simulator may be used to collect data in Leaderboard 2.0, and a rule-based virtual vehicle with priority is used. Leaderboard 2.0 introduces two new large-scale maps and a new set of scenarios to enhance the diversity of training and evaluation environments. A training set is constructed using one of the virtual scenarios (for example, Town 12), and a test set is constructed using another virtual scenario (for example, Town 13). A series of routes are set up in urban, residential, and rural areas in the virtual scenario, and the virtual vehicle travels along these routes.

In an embodiment, constructing, based on the driving-related data, the multiple Q&A pairs in the reasoning stage corresponding to the image frame may be as follows: based on the question sentences of the road layout, stop signs, traffic lights, and vehicles included in the original data set in the autonomous driving simulator, in conjunction with the collected driving-related data, generating, by the annotator, the multiple Q&A pairs in the reasoning stage corresponding to the image frame.

In an embodiment, adding the directed edges among the multiple Q&A pairs based on the logical dependencies among the multiple Q&A pairs may be as follows: establishing the logical dependencies among the Q&A pairs according to the requirements to add the directed edges among the Q&A pairs according to the logical dependencies to obtain the QA network graph corresponding to the key frame.

In S120, the VQA network graph is used as a sample set and the sample set is divided into a training set and a test set.

In an embodiment, dividing the sample set into the training set and the test set may be as follows: dividing the sample set into the training set and the test set according to a certain ratio. For example, the ratio is 8:2.

In S130, the driving behavior prediction model and the driving trajectory prediction model are trained based on the training set and the driving behavior prediction model and the driving trajectory prediction model are evaluated based on the test set.

The driving behavior prediction model and the driving trajectory prediction model may be constructed based on the vision-language model (VLM). In this embodiment, the Q&A pairs at different reasoning stages in the VQA network graph in the training set are used as the inputs to the driving behavior prediction model and the driving trajectory prediction model, so as to train the models.

The QA includes a question sentence and a real answering sentence. The VQA network graph also carries a real driving behavior and a real driving trajectory corresponding to the image frame. The real driving behavior includes a real driving speed and a real steering angle. The driving trajectory is represented by the position coordinates of multiple trajectory points.

In this embodiment, training the driving behavior prediction model based on the training set may be as follows: traversing the multiple nodes in sequence according to logical dependencies among the multiple nodes in the VQA network graph until all the multiple nodes are traversed; in response to that a node of the multiple nodes traversed has a predecessor node, inputting the image frame and a question sentence of the node into the driving behavior prediction model and outputting a predicted answering sentence of the node, and in response to that a node of the multiple nodes traversed has a predecessor node, inputting a Q&A pair of the predecessor node and a question sentence of the node into the driving behavior prediction model and outputting a predicted answering sentence of the node; inputting Q&A pairs of all the multiple nodes in the VQA network graph into the driving behavior prediction model and outputting a predicted driving behavior; and training the driving behavior prediction model based on predicted answering sentences of the multiple nodes, real answering sentences of the multiple nodes, the predicted driving behavior, and the real driving behavior.

The driving behavior may include two pieces of information: the driving speed and the steering angle. The driving speed may include five speed levels: very slow speed, slow speed, normal speed, fast speed, and very fast speed. The speed range corresponding to each speed level may be preset. The steering angle may include five steering levels: left turn, slight left turn, straight ahead, slight right turn, and right turn. The angle range corresponding to each steering level may be preset.

Traversing the nodes in sequence according to the logical dependency between the nodes in the VQA network graph may be understood as follows: traversing the nodes starting from the nodes in the initial reasoning stage until the nodes in the final reasoning stage are traversed. For example, in this embodiment, the QA network graph is traversed starting from the nodes in the perception stage until the nodes in the planning stage are traversed.

In a case where a traversed node do not have any predecessor node, it is indicated that the traversed node is in the initial reasoning stage (such as the perception stage), and in this case, the image frame and the question sentence of the node are inputted into the driving behavior prediction model and the predicted answering sentence of the node is outputted. In a case where a traversed node has at least one predecessor node, it is indicated that the traversed node is in an intermediate stage or in a final stage of the reasoning stages (such as the prediction stage or the planning stage), and in this case, the Q&A pair of all the at least one predecessor node of the node and the question sentence of the node are inputted into the driving behavior prediction model and the predicted answering sentence of the node is outputted. For example, as shown in FIG. 2, QA1, QA4, and QA7 are nodes that do not have any predecessor node, and the remaining nodes each have at least one predecessor node. The predecessor nodes of QA6 include QA4, QA5, and QA7. The Q&A pairs of all the nodes in the VQA network graph are inputted into the driving behavior prediction model and the predicted driving behavior is outputted.

In an embodiment, training the driving behavior prediction model based on the predicted answering sentences of the multiple nodes, the real answering sentences of the multiple nodes, the predicted driving behavior, and the real driving behavior may be as follows: determining a first sub-loss function according to the predicted answering sentences of the multiple nodes and the real answering sentences of the multiple nodes, determining a second sub-loss function according to the predicted driving behavior and the real driving behavior of the VQA network graph, superimposing the final sub-loss function and the second sub-loss function to obtain a final loss function, and training the driving behavior prediction model based on the final loss function.

In this embodiment, training the driving trajectory prediction model based on the training set may be as follows: inputting the image frame of the VQA network graph, Q&A pairs of all the multiple nodes, and the real driving behavior into the driving trajectory prediction model and outputting a predicted driving trajectory; and training the driving trajectory prediction model based on the predicted driving trajectory and the real driving trajectory.

Since the driving trajectory prediction model cannot output a precise numerical result, coordinate values are represented by trajectory segmentation in this embodiment. According to the statistical data of the trajectory of the training set, each of the abscissa axis and the ordinate axis of the driving trajectory may be divided into a set number (for example, 256) of bins, the word segmentation in the tokenizer is redefined, and the correspondence between the bins on the coordinate axis and the work segmentation is established so that the driving trajectory prediction model represents the driving trajectory in the form of outputted word segmentation. In an embodiment, the image frame of the VQA network graph, Q&A pairs of all the multiple nodes, and the real driving behavior are inputted into the driving trajectory prediction model and the predicted driving trajectory is outputted.

In an embodiment, training the driving trajectory prediction model based on the predicted driving trajectory and the real driving trajectory may be as follows: determining a loss function based on the predicted driving trajectory and the real driving trajectory and training the driving trajectory prediction model based on the loss function.

In this embodiment, after the driving behavior prediction model and the driving trajectory prediction model are trained based on the training set, the driving behavior prediction model and the driving trajectory prediction model are evaluated based on the test set, so as to evaluate the accuracy of the driving behavior prediction model and the driving trajectory prediction model.

In this embodiment, evaluating the driving behavior prediction model based on the test set may be as follows: traversing the multiple nodes in sequence according to logical dependencies among the multiple nodes in the VQA network graph until all the multiple nodes are traversed; in response to that a node of the multiple nodes traversed does not have any predecessor node, inputting the image frame and a question sentence of the node into the driving behavior prediction model trained and outputting a predicted answering sentence of the node, and in response to that a node of the multiple nodes traversed have a predecessor node, inputting a Q&A pair of the predecessor node and a question sentence of the node into the driving behavior prediction model trained and outputting a predicted answering sentence of the node; inputting Q&A pairs of all the multiple nodes in the VQA network graph into the driving behavior prediction model trained and outputting a predicted driving behavior; and evaluating the predicted answering sentences of the multiple nodes based on real answering sentences of the multiple nodes to obtain a QA evaluation metrics, and evaluating the predicted driving behavior based on the real driving behavior to obtain an accuracy evaluation metrics.

The accuracy evaluation metrics includes a speed accuracy evaluation metrics and a steering angle accuracy evaluation metrics. The QA evaluation metrics may include a semantic propositional image caption evaluation (SPICE) metrics and/or a generative pre-trained transformer (GPT) metrics. In this embodiment, after the driving behavior prediction model is trained, in the preceding manner, the Q&A pairs of the VQA network graph in the test set are inputted into the driving behavior prediction model, and the predicted driving behavior corresponding to each node and the predicted driving behavior corresponding to each VQA network graph are outputted. The predicted answering sentence is evaluated based on the real answering sentence of each node, and the SPICE metrics and the GPT metrics of the trained driving behavior prediction model are obtained. The predicted driving behavior is evaluated based on the real driving behavior, and the speed accuracy and the steering angle accuracy of the trained driving behavior prediction model are obtained.

In an embodiment, evaluating the driving trajectory prediction model based on the test set may be as follows: inputting Q&A pairs of all the multiple nodes in the VQA network graph and the real driving behavior into the driving trajectory prediction model trained and outputting a predicted driving trajectory; and evaluating the predicted driving trajectory based on the real driving trajectory to obtain an error evaluation metrics.

The error evaluation metrics includes an average displacement error evaluation metrics and a final displacement error evaluation metrics. The average displacement error evaluation metrics may be represented by the average Euclidean distance between the predicted driving trajectory and the real driving trajectory, and the final displacement error evaluation metrics may be represented by the Euclidean distance between the predicted end point and the real end point.

In an embodiment, after the driving behavior prediction model and the driving trajectory prediction model are evaluated based on the test set, the following steps are further included: acquiring a target image frame and multiple question sentences, where the multiple question sentences have a logical relationship; inputting the target image frame and the multiple question sentences into the driving behavior prediction model in sequence according to the logical relationship to obtain a target driving behavior and multiple answering sentences of the multiple question sentences, where the multiple question sentences and the multiple answering sentences compose multiple Q&A pairs; and inputting the target image frame, the multiple Q&A pairs, and the target driving behavior into the driving trajectory prediction model and outputting a target driving trajectory corresponding to the target image frame.

The multiple question sentences have a logical relationship, and the multiple question sentences and the multiple answering sentences compose multiple Q&A pairs. The target image frame may be an image of the surrounding environment collected while the vehicle is driving. The multiple question sentences may be logically progressive in different reasoning stages, that is, the multiple question sentences have a logical relationship. In an embodiment, the target image frame and the first question sentence of the multiple question sentences are inputted into the driving behavior prediction model; the first answering sentence of the multiple answering sentences is outputted, where the first question sentence and the first answering sentence compose the first Q&A pair of the multiple Q&A pairs; the first Q&A pair and the second question sentence of the multiple question sentences are inputted into the driving behavior prediction model, and the second answering sentence of the multiple answering sentences is outputted, where the second question sentence and the second answering sentence compose the second Q&A pair of the multiple Q&A pairs; the first Q&A pair, the second Q&A pair, and the third question sentence of the multiple question sentences are inputted into the driving behavior prediction model, and the third answering sentence of the multiple answering sentences is outputted, where the third question sentence and the third answering sentence compose the third Q&A pair of the multiple Q&A pairs; and so on until all question sentences are inputted into the driving behavior prediction model to obtain the target driving behavior and multiple Q&A pairs. Finally, the target image frame, the multiple Q&A pairs, and the target driving behavior are inputted into the driving trajectory prediction model and the target driving trajectory corresponding to the target image frame is outputted.

In the technical solution of this embodiment, a VQA network graph is constructed based on an autonomous driving data set and/or an autonomous driving simulator, where the VQA network graph includes an image frame and a QA network graph corresponding to the image frame, the QA network graph is composed of multiple nodes and directed edges among the multiple nodes, and each node carries a Q&A pair; the VQA network graph is used as a sample set and the sample set is divided into a training set and a test set; and the driving behavior prediction model and the driving trajectory prediction model are trained based on the training set and the driving behavior prediction model and the driving trajectory prediction model are evaluated based on the test set. In the method for training an autonomous driving model provided in the embodiment of the present disclosure, the autonomous driving model is trained and evaluated based on the VQA network graph constructed through the autonomous driving data set and/or the autonomous driving simulator, thereby improving the generalization and interactivity of the autonomous driving model.

Embodiment Two

In recent years, scenario generation in the field of autonomous driving has also received extensive research attention. A simulation environment is constructed using the neural radiance field (NeRF) according to real data. For example, a video is rendered from a given picture by borrowing objects that satisfy the requirements from other scenarios, or closed-loop simulation and sensor screen rendering are performed by constructing digital twins of scenarios and intelligent agents in the data set. The video may be generated using a diffusion model, and the diffusion model may use layout information to control the video to be rendered. For example, the diffusion model GeoDiffusion may use 2D bounding boxes to render the video, and the neural field diffusion model NeuralField-LDM and the conditional generative model BEVGen may use the bird's-eye-view segmentation to render the video.

However, in the related video prediction method, a high-quality manually annotated data set is generally required to train the video prediction model, larger-scale unannotated video data cannot be used to train the model, it is difficult to expand to a larger-scale data set, and the video prediction model generally prefers to generate the video according to given layout information.

FIG. 3 is a flowchart of a method for training an autonomous driving model according to embodiment two of the present disclosure. This embodiment may be applied to the case of training the video prediction model. The method may be performed by a model training apparatus. The model training apparatus may be implemented in the form of hardware and/or software. The model training apparatus may be configured in an electronic device. The electronic device may be formed by two or more physical entities or may be formed by one physical entity.

As shown in FIG. 3, the method for training an autonomous driving model provided in the embodiment of the present disclosure includes steps S101 to S103 below.

In S101, according to an initial video frame collected by a target vehicle and/or scenario description metadata of the initial video frame, a scenario context of the initial video frame is determined.

In S102, a vehicle movement instruction of the target vehicle is determined according to the initial video frame and/or trajectory data of the target vehicle corresponding to the initial video frame.

FIG. 4 is a flowchart of generating control texts according to embodiment two of the present disclosure. In this embodiment, as shown in FIG. 4, the scenario context and the vehicle movement instruction of the unannotated initial video frame may be automatically generated using the VLM such as BLIP-2 (an image-to-text model) and a model for camera behavior classification based on the video optical flow, respectively. For the initial video frame with trajectory data, such as a trajectory true value, and the scenario description metadata, the metadata may be converted into the natural language using the natural language model such as the GPT model, the vehicle behavior corresponding to each initial video frame is determined from the corresponding trajectory, and the vehicle movement instruction is determined according to the behavior.

In S103, an initial model is trained using the initial video frame and a control text corresponding to the initial video frame, to obtain the video prediction model, where the control text includes the scenario context and the vehicle movement instruction, and the video prediction model is configured to output a predicted video frame.

In this embodiment, the initial model may be the Stable Diffusion XL (hereinafter referred to as SDXL) model. The SDXL model is a text-to-image model that generates an image from a given text and is implemented based on the diffusion model. In the process of training the SDXL model using the image-text pair (that is, the initial video frame and the corresponding control text), the image and the text may first be encoded by the vector quantised-variational auto-encoder (VQ-VAE) and the contrastive language-image pre-training (CLIP) encoder, respectively to encode the feature map and the text. The SDXL model may learn how to gradually reduce noise on the noised feature map under the control condition of text embedding. The training goal is to make the image after each step of noise reduction as close as possible to the original image without noise addition. After being trained, the SDXL model may gradually denoise the Gaussian noise map according to the given text and finally, generate a feature map that conforms to the description of the control text, and through the VQ-VAE, the feature map may then be converted into a driving point of view image that conforms to the description of the control text.

In the method for training an autonomous driving model provided in the embodiment of the present disclosure, an initial video frame collected by a target vehicle and/or scenario description metadata of the initial video frame are used to determine a scenario context of the initial video frame; a vehicle movement instruction of the target vehicle is determined using the initial video frame and/or trajectory data of the target vehicle corresponding to the initial video frame; and an initial model is trained using the initial video frame and a corresponding control text to obtain the video prediction model, where the control text includes the scenario context and the vehicle movement instruction, and the video prediction model is configured to output a predicted video frame.

In the technical solution of the embodiment of the present disclosure, the automatic annotation of the natural language instruction and scenario context is performed on the large-scale unannotated data (video frame) set using the initial video frame and/or the data of the initial video frame, and by training the model using the initial video frame and the corresponding control text, according to the existing pictures and natural language-based control text, the model may output frames that predict future pictures. This solution has higher universality and generalization, and in this solution, training samples can be generated more freely without being limited by the camera settings or shooting scenarios of the small-scale public driving data set, thereby solving the problem of the video prediction model being limited by the annotation data set and layout information.

In an embodiment, the step of training the initial model using the initial video frame and the corresponding control text to obtain the video prediction model includes inputting image embedding of at least one initial video frame and text embedding of the corresponding control text into a Stable Diffusion XL model to obtain a denoised image and determining a loss function value according to the denoised image; determining an intermediate model according to the loss function value and updating the intermediate model using an attention mechanism to obtain a to-be-trained model; and training the to-be-trained model using image embedding of multiple initial video frames and text embedding of control texts corresponding to the multiple initial video frames, to obtain the video prediction model. The advantage of this setting is that by training the initial model in two stages using large-scale diverse data sets, the obtained video prediction model has better zero-sample generalization capabilities than the existing driving video generation model, and the generated predicted video frame includes richer scenarios and objects.

In an embodiment, the initial model may be trained in two stages. FIG. 5 is a schematic diagram of training a first-stage model according to embodiment two of the present disclosure. As shown in FIG. 5, the SDXL model may be trained for multiple times using the image-text embedding pair formed by the image embedding of at least one initial video frame and the text embedding of the corresponding control text, and the denoised image generated by the SDXL model according to the text embedding can be obtained during training at each time. According to the difference between the denoised image and the initial video frame, the loss function value may be obtained. If the loss function value is less than a preset value, it is indicated that the first stage of training is completed and the intermediate model (image generation model) is obtained. The attention mechanism may be introduced into the intermediate model to process temporal information. For example, the attention mechanism for processing the temporal information is introduced into the Transformer model included in the intermediate model to obtain the to-be-trained model. During the second stage of training, the intermediate model may be trained for multiple times using multiple image-text embedding pairs, and the loss function values and the video prediction model are determined according to the differences between all generated denoised video frames and the initial video frames inputted at the time points corresponding to the time points of the denoised video frames. The initial video frames corresponding to the image embedding in the multiple image-text embedding pairs may be multiple adjacent video frames in the same video. Since the time interval between the initial video frames corresponding to the image embedding in the multiple image-text embedding pairs is very short, the text embedding of the control texts in the multiple image-text embedding pairs may be the same. In particular, the scenario context or the vehicle movement instruction may be discarded with a certain probability during the training process to cope with the case of no control text input during application.

For example, the loss function value $\mathcal{L}_{img}$ may be determined according to the following formula:

$$\mathcal{L}_{img} = E_{x,\epsilon \sim \mathcal{N}(0,1),c,t}[\|\epsilon - f_\theta(x_t; c, t)\|_2^2].$$

According to the result $x_t$ after noise addition, the given control condition c, and the number t of steps of current noise addition, the diffusion model $f_\theta$ ($\theta$ denotes a to-be-trained parameter) in the SDXL model needs to predict the noise added to the original image (that is, the initial video frame) during the noise addition process. The training goal is that the predicted noise value is as close as possible to the actual noise value e. The control condition c is the text embedding of the control text, $$\| \|_2^2$$

denotes the square of the second norm, and the process of adding noise to the image embedding is not known to the SDXL model when performing denoising.

In an embodiment, before the to-be-trained model is trained using the image embedding of the multiple initial video frames and the text embedding of the control texts corresponding to the multiple initial video frames, to obtain the video prediction model, the following is further included: processing the trajectory data using a Fourier embedding layer to obtain high-dimensional trajectory embedding, and encoding and projecting the high-dimensional trajectory embedding using a preset linear layer to obtain a projection embedding. Training the to-be-trained model using the image embedding of the multiple initial video frames and the text embedding of the control texts corresponding to the multiple initial video frames, to obtain the video prediction model includes training the to-be-trained model using the image embedding of the multiple initial video frames and text embedding of the text conditions corresponding to the multiple initial video frames, to obtain the video prediction model, where text embedding of text conditions include text embedding of the scenario context and the vehicle movement instruction and the projection embedding. The advantage of this setting is that by introducing trajectory numerical information, the video prediction model can generate the predicted video frame with a more accurate video angle.

In an embodiment, the trajectory values in the trajectory data are encoded into the high-dimensional trajectory embedding using the Fourier embedding layer. Then, the projection embedding obtained by projecting the high-dimensional trajectory embedding using the learnable preset linear layer is added to the text embedding of the control texts, so as to obtain a text embedding of text conditions. The text embedding of text conditions is inputted into the to-be-trained model, and by training the to-be-trained model multiple times, the finally obtained video prediction model can generate the predicted video frame with a more accurate video angle according to the given initial frame (initial video frame) and the text conditions.

It is to be noted that embedding herein, including but not limited to image embedding, text embedding, Fourier embedding, trajectory embedding, or project embedding, refers to embedding in latent space, unless otherwise specified.

Embodiment Three

FIG. 6 is a flowchart of a method for training an autonomous driving model according to embodiment three of the present disclosure. The technical solution of the embodiment of the present disclosure is further optimized based on the technical solutions in embodiment two above, and the embodiment in which the video prediction model is trained is provided.

In an embodiment, updating the intermediate model using the attention mechanism so that the intermediate model can process the temporal information and the to-be-trained model is obtained includes inserting a preset TRB before each of a spatial attention block, a cross attention block, and a feed-forward neural network of a Transformer model in the intermediate model to obtain the to-be-trained model; where the preset TRB includes a causal temporal attention subblock and a decoupled spatial attention subblock, where the causal temporal attention subblock is configured to weigh the input of the Transformer model based on the attention mechanism, and the decoupled spatial attention subblock is configured to decouple the spatial attention of the output of the causal temporal attention subblock. The advantage of this setting is that the video prediction model has an interval structure with a layer of spatial interaction and a layer of temporal interaction and can temporally associate the generated prediction frame with the given initial frame, the decoupled spatial attention subblock assists the video prediction module to capture the correlation between different pixels more efficiently, and the video prediction model can well process driving scenarios with large dynamics and complex movements of the intelligent agents.

In an embodiment, training the to-be-trained model using the image embedding of the multiple initial video frames and the text embedding of the control texts corresponding to the multiple initial video frames, to obtain the video prediction model includes inputting the image embedding of the multiple initial video frames and the text embedding of the control texts corresponding to the multiple initial video frames into the to-be-trained model, to obtain noised video frames, where the noised video frames include initial video frames with different noise levels; and denoising image embedding of the noised video frames through the to-be-trained model to obtain denoised video frames whose number is the same as the number of the noised video frames and determining the video prediction model according to the denoised video frames. The advantage of this setting is that by training the to-be-trained model, the generated video prediction model can output a more accurate predicted video frame according to the control text.

As shown in FIG. 6, the method for training an autonomous driving model provided in embodiment three of the present disclosure includes steps S201 to S207 below.

In S201, according to an initial video frame collected by a target vehicle and/or scenario description metadata of an initial video frame, a scenario context of the initial video frame is determined.

In S202, a vehicle movement instruction of the target vehicle is determined according to the initial video frame and/or trajectory data of the target vehicle corresponding to the initial video frame.

In S203, image embedding of at least one initial video frame and text embedding of text conditions corresponding to the at least one initial video frame are inputted into a Stable Diffusion XL model to obtain a denoised image, and a loss function value is determined according to the denoised image.

In S204, an intermediated model is determined according to the loss function value, and a preset TRB is inserted before each of a spatial attention block, a cross attention block, and a feed-forward neural network of a Transformer model in the intermediate model, to obtain the to-be-trained model.

The preset TRB includes a causal temporal attention subblock and a decoupled spatial attention subblock, where the causal temporal attention subblock is configured to weigh the input of the Transformer model based on the attention mechanism, and the decoupled spatial attention subblock is configured to decouple the spatial attention of the output of the causal temporal attention subblock.

In an embodiment, a causal mask layer is disposed in front of a Softmax layer of the causal temporal attention subblock, and the initial parameters of the last linear layers in the causal temporal attention subblock and the decoupled spatial attention subblock are zero. In this manner, it is ensured that in the causal temporal attention subblock, the feature at the current moment cannot access about the feature at the prediction moment, so as to prevent the leakage of the predicted feature from affecting the learning ability of the model to predict the future and prevent the intermediate model from being affected by the parameter initialization of the preset TRB.

In an embodiment, the training parameter of the intermediate model may be fixed. Based on the intermediate model, a deep interaction (DI) mechanism is introduced, and the preset TRB is added before each of the spatial attention block, the cross attention block, and the feed-forward neural network of the Transformer model included in the intermediate model so that the video prediction model has an interval structure with a layer of spatial interaction and a layer of temporal interaction and can temporally associate the generated prediction frame with the given initial frame.

Figure 7:
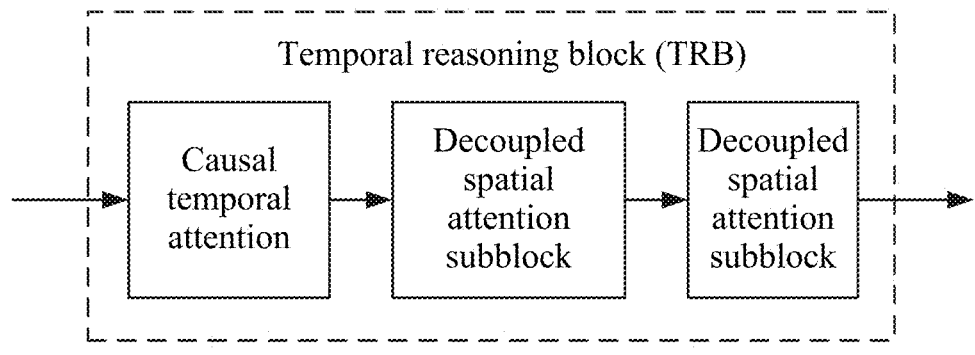
FIG. 7 is a structural diagram of a temporal reasoning block (TRB) according to embodiment three of the present disclosure.

In an embodiment, FIG. 7 is a structural diagram of a TRB according to embodiment three of the present disclosure. As shown in FIG. 7, the preset TRB includes the causal temporal attention subblock and the decoupled spatial attention subblock. The function of the causal temporal attention (Causal TA) submodule is implemented through the attention mechanism, and the Causal TA submodule can treat the feature inputs of H*W*T feature dimensions as T features (each feature dimension is H*W) for processing.

Figure 8:
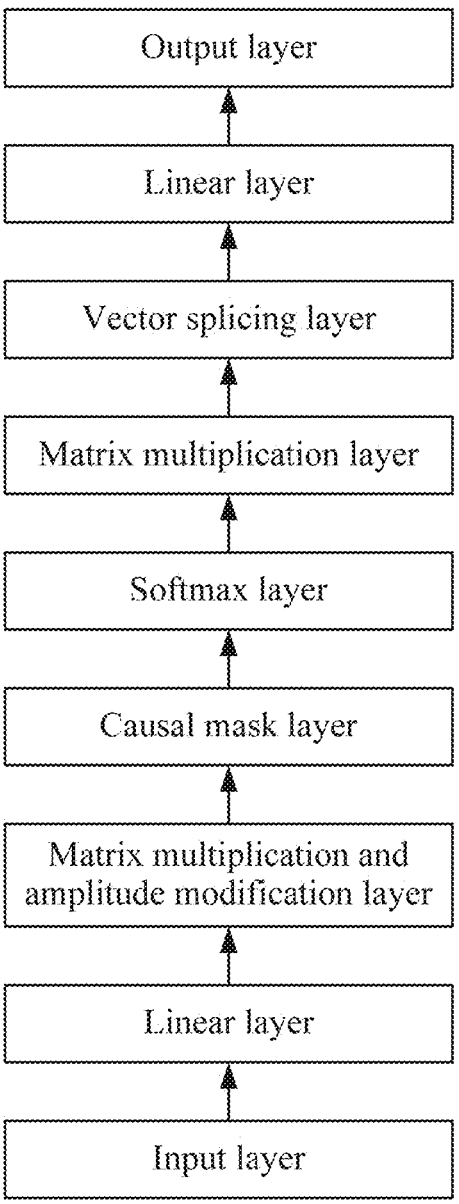
FIG. 8 is a structural diagram of a causal temporal attention subblock according to embodiment three of the present disclosure.

FIG. 8 is a structural diagram of a causal temporal attention subblock according to embodiment three of the present disclosure. As shown in FIG. 8, the causal mask layer is disposed in front of the Softmax layer of the causal temporal attention subblock. Before the Softmax layer, the causal mask layer may forcibly set the value that is in the matrix multiplication result of the query value and the key value and does not conform to the causal relationship to negative infinity so that the output result of the value after the Softmax layer is zero, thereby achieving the constraints on the causal relationship. The causal mask layer ensures that in the causal temporal attention subblock, the feature at the current moment cannot access the feature at the prediction moment, thereby preventing the leakage of the predicted feature from affecting the learning ability of the model to predict the future image. All-zero initialization is performed on the last linear layers in the causal temporal attention subblock and the decoupled spatial attention subblock so that the intermediate model at the start of training can be directly equivalent to the model before the preset TRB is added, thereby ensuring that the intermediate model is not affected by the parameter initialization of the preset TRB and ensuring that the preset TRB that has not yet performed learning does not interfere with the generation of the predicted video frame.

In an embodiment, the function of the decoupled spatial attention (Decoupled SA) submodule is implemented through the attention mechanism, and the Decoupled SA submodule can decouple the output of the causal temporal attention subblock (that is, the feature input of the decoupled spatial attention subblock). For example, two decoupled spatial attention subblocks can decouple the feature inputs of H\*W\*T feature dimensions to two preset vertical directions, respectively and use the inputs as H features (each feature dimension is W\*T) and W features (each feature dimension is H\*T) for processing.

In S205, the trajectory data is processed using a Fourier embedding layer to obtain a high-dimensional trajectory embedding, and the high-dimensional trajectory embedding is encoded and projected using a preset linear layer to obtain a projection embedding.

In S206, image embedding of multiple initial video frames and the text embedding of text conditions corresponding to the multiple initial video frames are inputted into a to-be-trained model, to obtain noised video frames.

The noised video frames include initial video frames with different noise levels.

In an embodiment, FIG. 9 is a schematic diagram of training a second-stage model according to embodiment three of the present disclosure. As shown in FIG. 9, the to-be-trained model may add noise to the image embedding $v=\{v^m, v^n\}$ of T initial video frames to obtain the noised video frames, where the first m frames (that is, $v^m$) are image embedding (used as initial frames) without noise addition or with only a small amount of noise addition, the last $n=T-m$ frames (that is, $v^n$) are $$v_t^n$$

after noise addition (used as to-be-predicted prediction frames), t denotes the number of steps of noise addition, and the noised video frames include $v^n$ and $$v_t^n.$$

In S207, image embedding of the noised video frames are denoised through the to-be-trained model to obtain denoised video frames and the video prediction model is determined according to the denoised video frames.

In an embodiment, the image embedding of the noised video frames are denoised through the to-be-trained model to obtain the denoised video frames. The loss function value $\mathcal{L}_{vid}$ of the to-be-trained model may be determined through a formula as follows:

$$\mathcal{L}_{vid} = \mathbb{E}_{v,\epsilon \sim N(0,1),c,t}\left[\|\epsilon - f_{\theta,\phi}(v_t^n; v^m, c, t)\|_2^2\right].$$

Through the initial frame $v^n$, the given control condition c, and the current number of steps of noise addition t, the diffusion model $f_{\theta,\phi}$ added to the preset TRB (a to-be-learned parameter φ) needs to predict which type of interaction exists between the features of the to-be-predicted prediction frame during the noise addition process. The training goal is that the noise predicted by the model is as close as possible to the noise e actually added in the previous stage.

In an embodiment, the video prediction model further includes a preset multi-layer neural network after a Transformer model, where the preset multi-layer neural network is configured to generate predicted trajectory points of the target vehicle corresponding to the predicted video frame according to a feature map outputted by the Transformer model. In this manner, the driving trajectory points of the vehicle can be predicted by training a lightweight neural network.

In an embodiment, all parameters in the trained video prediction model may be fixed, and the feature at the bottom of the U-Net structure in the video prediction model, that is, the feature map outputted by the Transformer model, is inputted into the preset two-layer neural network. The preset two-layer neural network is used as a planner which can predict future driving trajectory points according to the predicted feature map.

It is to be noted that to verify the prediction effect of the video prediction model, the FID value and the FVD value of the video prediction model may be determined by using the NuScenes data set. The FID value and the FVD value are common metrics for evaluation in the video generation field. FID is used for evaluating the similarity between the generated image and the real image in a certain data set, that is, evaluating the authenticity of the generated image. FVD is used for evaluating the similarity between the generated video and the real video in a certain data set, that is, evaluating the authenticity of the generated video. The comparison between the prediction effect of the video prediction model and the effects of other prediction models is shown in the effect evaluation comparison table (Table 1) below.

TABLE 1

| Effect evaluation comparison table | | | | |
|---|---|---|---|---|
| Model | Training data set | Whether to predict the future | FID ($\downarrow$) | FVD ($\downarrow$) |
| DriveGAN | NuScenes | Yes | 73.4 | 502 |
| DriveDreamer | | Yes | 52.6 | 452 |
| DrivingDiffusion | | No | 15.8 | 332 |
| Video prediction model | OpenDV-2K | Yes | 15.4 | 184 |

The smaller the values of FID and FVD are, the better the effect is and the closer it is to the real video. The DrivingDiffusion model is not a predictive video generation model, but a video generation model that performs rendering according to the given condition and cannot predict the future. In the other three methods, only the NuScenes data set is used for training, and the methods should theoretically have better results. However, in this case, the video prediction model is still better than the preceding existing models in relevant metrics.

For the TRB and the DI mechanism in the video prediction model, ablation experiments may be conducted on the OpenDV-2K evaluation set to test the effects. It is to be noted that the OpenDV-2K evaluation set is completely separated from the training set, and no duplicate videos exist. The CLIPSIM metrics is the average similarity of the corresponding features between the generated prediction frame and the given initial frame. The CLIPSIM metrics may be used for measuring the consistency between the generated predicted video and the given initial frame. The results of the ablation experiments of the TRB and the DI mechanism are shown in the ablation experimental result information table (Table 2) below.

TABLE 2

| Ablation experimental result information table | | | |
| --- | --- | --- | --- |
| Method | FID ($\downarrow$) | FVD ($\downarrow$) | CLIPSIM ($\uparrow$) |
| Baseline | 18.32 | 244.44 | 0.8405 |
| DI | 17.96 | 201.69 | 0.8409 |
| Causal temporal attention | 16.54 | 207.45 | 0.8550 |
| Decoupled spatial attention | 17.67 | 189.54 | 0.8652 |

The larger the CLIPSIM is, the higher the consistency between the predicted video and the given initial frame is. It can be seen from the preceding experimental results that the TRB and the DI mechanism in the video prediction model can enhance the authenticity of the predicted image and video, enhance the consistency between the predicted video and the given initial frame, and effectively improve the effect of the generated predicted video.

To measure the consistency between the predicted video generated by the video prediction model according to the vehicle trajectory and the given vehicle trajectory, the video prediction model may be compared with the inverse dynamic model (IDM). The IDM may be used for converting the generated predicted video into the trajectory and calculating the Euclidean distance between the trajectory and the true value of the given vehicle trajectory. The distance is recorded as an action prediction error in the controllability experimental result information table (Table 3) below. The experimental result information of the consistency between the predicted video generated according to the vehicle trajectory and the given vehicle trajectory is shown in the controllability experimental result information table (Table 3) below.

TABLE 3

| Controllability experimental result information table | | |
| --- | --- | --- |
| Method | Control condition | Action Prediction Error ($\downarrow$) |
| Video prediction model | Natural language | 2.54 |
| Video prediction model | Natural language + accurate trajectory | 2.02 |

As can be seen from Table 3 above, the video prediction model into which accurate trajectory information is inputted (that is, the projection embedding is inputted) can output more accurate and controllable videos, and the action prediction error is reduced by 20.4%.

To measure the effectiveness of feature extraction of the video prediction model, the metrics of the end-to-end autonomous driving planning model on the NuScenes data set may be compared with the video prediction model. The comparison results are shown in the feature extraction effectiveness experimental result information table (Table 4).

TABLE 4

| Feature extraction effectiveness experimental result information table | | | |
| --- | --- | --- | --- |
| Model | Amount of parameters to be learned | ADE ($\downarrow$) | FDE ($\downarrow$) |
| ST-P3* | 10.9M | 2.11 | 2.90 |
| UniAD* | 58.8M | 1.03 | 1.65 |
| Video prediction model | 0.8M | 1.23 | 2.31 |

ST-P3* and UniAD* indicate that ST-P3 and UniAD use images from multiple perspectives around as the inputs, while the video prediction model uses only front view images.

The average displacement error (ADE) represents the Euclidean distance between the predicted trajectory outputted by the preset multi-layer neural network in the video prediction model and the trajectory true value. The final displacement error (FDE) represents the Euclidean distance between the predicted end point of the trajectory points outputted by the preset multi-layer neural network and the true value of the end point of the trajectory points. As can be seen from Table 3, the preset multi-layer neural network in the video prediction model can achieve better results than ST-P3 with one-tenth of the amount of parameters to be learned in ST-P3. Compared with UniAD, the preset multi-layer neural network can achieve relatively good results by using only one-seventieth of the amount of parameters to be learned, and a shorter training time on NVIDIA Tesla V100 is required, which is faster than the training of UniAD by nearly 3400 times.

In the method for training an autonomous driving model according to the embodiment of the present disclosure, the to-be-trained model is trained so that the generated video prediction model can output more accurate predicted video frames according to the control text, the video prediction model has an interval structure with a layer of spatial interaction and a layer of temporal interaction and can temporally associate the generated prediction frame with the given initial frame, the decoupled spatial attention subblock assists the video prediction module to capture the correlation between different pixels more efficiently, and the video prediction model can well process driving scenarios with large dynamics and complex movements of the intelligent agents.

Embodiment Four

FIG. 10 is a flowchart of a video prediction method according to embodiment four of the present disclosure. This embodiment may be applied to the case of generating the predicted video. The method may be performed by a video prediction apparatus. The video prediction apparatus may be implemented in the form of hardware and/or software. The video prediction apparatus may be configured in an electronic device. The electronic device may be formed by two or more physical entities or may be formed by one physical entity.

As shown in FIG. 10, the video prediction method includes the steps described below.

In S301, at least one conditional video frame, a target scenario context, and a target movement instruction of a current vehicle are acquired, where the target scenario context is a scenario context of a current scenario corresponding to the conditional video frame.

In this embodiment, the target movement instruction of the current vehicle may be understood as the driving movement instruction of the current vehicle, and the instruction may be inputted by the user of the current vehicle.

In S302, image embedding of the at least one conditional video frame and text embedding of text conditions are inputted into a preset video prediction model to obtain a predicted video, where the preset video prediction model is obtained by using the method for training an autonomous driving model including a video prediction model, and the text conditions includes the target scenario context and/or the target movement instruction.

In this embodiment, the image embedding of the at least one conditional video frame, such as one or two conditional video frames, and the text embedding of the corresponding text conditions may be used as the inputs of the preset video prediction model. The preset video prediction model can output the predicted video including multiple video frames. The predicted video includes reconstructed conditional video frames regenerated by an encoder and multiple predicted video frames, such as one or two reconstructed conditional video frames and six or seven predicted video frames.

In the video prediction method provided in the embodiment of the present disclosure, at least one conditional video frame, a target scenario context, and a target movement instruction of a current vehicle are acquired, where the target scenario context is a scenario context of a current scenario corresponding to the conditional video frame; and image embedding of the at least one conditional video frame and text embedding of text conditions are inputted into a preset video prediction model to obtain a predicted video, where the preset video prediction model is obtained by using the method for training an autonomous driving model according to embodiment two or three, and the text conditions includes the target scenario context and/or the target movement instruction. In the technical solution of the embodiment of the present disclosure, the image embedding of the conditional video frame and the text embedding of the corresponding text conditions including actual requirements are inputted into the model so that the predicted video can be obtained quickly and accurately.

Embodiment Five

Figure 11:
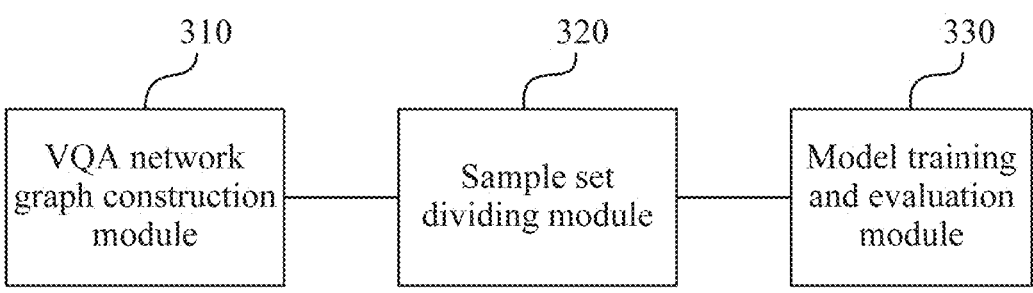
FIG. 11 is a structural diagram of an apparatus for training an autonomous driving model according to embodiment five of the present disclosure.

FIG. 11 is a structural diagram of an apparatus for training an autonomous driving model according to embodiment five of the present disclosure. The autonomous driving model includes a driving behavior prediction model and a driving trajectory prediction model. The apparatus for training an autonomous driving model includes a VQA network graph construction module 310, a sample set dividing module 320, and a model training and evaluation module 330.

The VQA network graph construction module 310 is configured to construct a VQA network graph based on an autonomous driving data set and/or an autonomous driving simulator, where the VQA network graph includes an image frame and a QA network graph corresponding to the image frame, the QA network graph is composed of multiple nodes and directed edges among the multiple nodes, and each of the multiple nodes carries a Q&A pair.

The sample set dividing module 320 is configured to use the VQA network graph as a sample set and divide the sample set into a training set and a test set.

The model training and evaluation module 330 is configured to train the driving behavior prediction model and the driving trajectory prediction model based on the training set and evaluate the driving behavior prediction model and the driving trajectory prediction model based on the test set.

In an embodiment, the VQA network graph construction module 310 is further configured to perform the steps described below.

A key frame is extracted from a driving video of the autonomous driving data set.

At least one key object is extracted from the key frame.

Multiple Q&A pairs in the reasoning stage are added for each of the at least one key object, where the reasoning stage includes at least one of a perception stage, a prediction stage, or a planning stage.

The directed edges are added among the multiple Q&A pairs based on logical dependencies among the multiple Q&A pairs to obtain the QA network graph corresponding to the key frame and a two-dimensional (2D) bounding box is added for a key object of the at least one key object in the key frame.

In an embodiment, the VQA network graph construction module 310 is further configured to perform the steps described below.

A virtual vehicle and a virtual scenario are created based on the autonomous driving simulator.

The virtual vehicle is controlled to drive in the virtual scenario and driving-related data of the virtual vehicle during driving is collected.

Based on the driving-related data, multiple Q&A pairs in a reasoning stage corresponding to the image frame are constructed.

The directed edges are added among the multiple Q&A pairs based on logical dependencies among the multiple Q&A pairs to obtain the QA network graph corresponding to the image frame.

In an embodiment, the QA includes a question sentence and a real answering sentence, and the VQA network graph also carries a real driving behavior and a real driving trajectory corresponding to the image frame, where the real driving behavior includes a real driving speed and a real steering angle.

In an embodiment, the model training and evaluation module 330 is further configured to perform the steps described below.

The multiple nodes are traversed in sequence according to logical dependencies among the multiple nodes in the VQA network graph until all the multiple nodes are traversed; in a case where a node of the multiple nodes traversed does not have a predecessor node, the image frame and the question sentence of the node are inputted into the driving behavior prediction model and a predicted answering sentence corresponding to the node is outputted; and in a case where a node of the multiple nodes traversed has a predecessor node, the Q&A pair of the predecessor node and the question sentence of the node are inputted into the driving behavior prediction model and the predicted answering sentence of the node is outputted.

The Q&A pairs of all the multiple nodes in the VQA network graph are inputted into the driving behavior prediction model and a predicted driving behavior is outputted.

The driving behavior prediction model is trained based on predicted answering sentences of the multiple nodes, real answering sentences of the multiple nodes, the predicted driving behavior, and the real driving behavior.

In an embodiment, the model training and evaluation module 330 is further configured to perform the steps described below.

The image frame of the VQA network graph, Q&A pairs of all the multiple nodes, and the real driving behavior are inputted into the driving trajectory prediction model and a predicted driving trajectory is outputted.

The driving trajectory prediction model is trained based on the predicted driving trajectory and the real driving trajectory.

In an embodiment, the model training and evaluation module 330 is further configured to perform the steps described below.

The multiple nodes are traversed in sequence according to logical dependencies among the multiple nodes in the VQA network graph until all the multiple nodes are traversed; in the case where a node of the multiple nodes traversed does not have a predecessor node, the image frame and the question sentence of the node are inputted into the driving behavior prediction model trained and a predicted answering sentence corresponding to the node is outputted; and in the case where a node of the multiple nodes traversed has the predecessor node, the Q&A pair of the predecessor node and the question sentence of the node are inputted into the driving behavior prediction model trained and the predicted answering sentence of the node is outputted.

The Q&A pairs of all the multiple nodes in the VQA network graph are inputted into the driving behavior prediction model and a predicted driving behavior is outputted.

The prediction answering sentence is evaluated based on real answering sentences of the multiple nodes to obtain a QA evaluation metrics, and the predicted driving behavior is evaluated based on the real driving behavior to obtain an accuracy evaluation metrics, where the accuracy evaluation metrics includes a speed accuracy evaluation metrics and a steering angle accuracy evaluation metrics.

In an embodiment, the model training and evaluation module 330 is further configured to perform the steps described below.

Q&A pairs of all the multiple nodes in the VQA network graph and the real driving behavior are inputted into the trained driving trajectory prediction model and a predicted driving trajectory is outputted.

The predicted driving trajectory is evaluated based on the real driving trajectory to obtain an error evaluation metrics, where the error evaluation metrics includes an average displacement error evaluation metrics and a final displacement error evaluation metrics.

In an embodiment, the apparatus for training an autonomous driving model further includes a target driving trajectory determination module configured to perform the steps described below.

A target image frame and multiple question sentences are acquired, where the multiple question sentences have a logical relationship.

The target image frame and the multiple question sentences are inputted into the driving behavior prediction model in sequence according to the logical relationship to obtain a target driving behavior and multiple answering sentences of the multiple question sentences, where the multiple question sentences and the multiple answering sentences compose multiple Q&A pairs.

The target image frame, multiple Q&A pairs, and the target driving behavior are inputted into the driving trajectory prediction model and a target driving trajectory corresponding to the target image frame is outputted.

The apparatus for training an autonomous driving model according to the embodiment of the present disclosure may perform the method for training an autonomous driving model according to any embodiment of the present disclosure and has functional modules and beneficial effects corresponding to the performed method. Technical details that are not described in detail in this embodiment, reference may be made to the method according to embodiment one of the present disclosure above.

Embodiment Six

Figure 12:
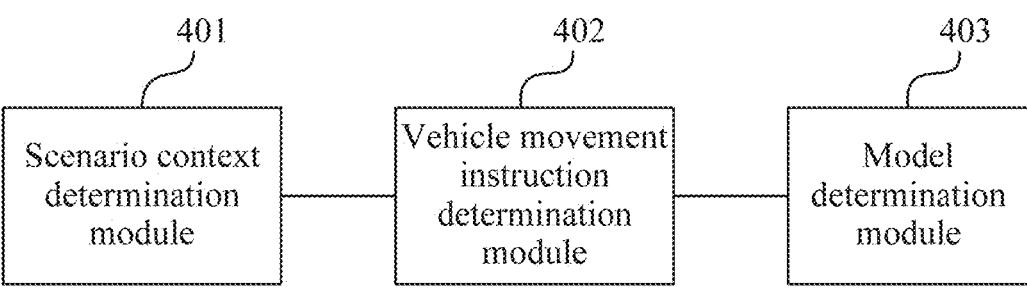
FIG. 12 is a structural diagram of an apparatus for training an autonomous driving model according to embodiment six of the present disclosure.

FIG. 12 is a structural diagram of a model training apparatus according to embodiment six of the present disclosure. As shown in FIG. 12, the apparatus includes a scenario context determination module 401, a vehicle movement instruction determination module 402, and a model determination module 403.

The scenario context determination module 401 is configured to determine, according to an initial video frame collected by a target vehicle and/or scenario description metadata of the initial video frame, a scenario context of the initial video frame.

The vehicle movement instruction determination module 402 is configured to determine a vehicle movement instruction of the target vehicle according to the initial video frame and/or trajectory data of the target vehicle corresponding to the initial video frame.

The model determination module 403 is configured to train an initial model using the initial video frame and a control text corresponding to the initial video frame, to obtain the video prediction model, where the control text includes the scenario context and the vehicle movement instruction, and the video prediction model is configured to output a predicted video frame.

In the model training apparatus provided in the embodiment of the present disclosure, the automatic annotation of the natural language instruction and scenario context is performed on the large-scale unannotated data (video frame) set using the initial video frame and/or the data of the initial video frame, and by training the model using the initial video frame and the corresponding control text, according to the existing pictures and natural language-based control text, the model may output frames that predict future pictures. This solution has higher universality and generalization, and in this solution, training samples can be generated more freely without being limited by the camera settings and shooting scenarios of the small-scale public driving data set, thereby solving the problem of the video prediction model being limited by the annotation data set and layout information.

In an embodiment, the model determination module 403 includes a loss function value determination unit, a model updating unit, and a model determination unit.

The loss function value determination unit is configured to input image embedding of at least one initial video frame and text embedding of the control text corresponding to the at least one initial video frame into a Stable Diffusion XL model to obtain a denoised image and determine a loss function value according to the denoised image.

The model updating unit is configured to determine an intermediate model according to the loss function value and update the intermediate model using an attention mechanism to enable the intermediate model to process temporal information and enable obtainment of a to-be-trained model.

The model determination unit is configured to train the to-be-trained model using image embedding of multiple initial video frames and text embedding of control texts corresponding to the multiple initial video frames, to obtain the video prediction model.

In an embodiment, updating the intermediate model using the attention mechanism to enable the intermediate model to process the temporal information and enable obtainment of the to-be-trained model includes inserting a preset TRB before each of a spatial attention block, a cross attention block, and a feed-forward neural network of a Transformer model in the intermediate model to obtain the to-be-trained model; where the preset TRB includes a causal temporal attention subblock and a decoupled spatial attention subblock, where the causal temporal attention subblock is configured to weigh the input of the Transformer model based on the attention mechanism, and the decoupled spatial attention subblock is configured to decouple the spatial attention of the output of the causal temporal attention subblock.

Further, a causal mask layer is disposed in front of a Softmax layer of the causal temporal attention subblock, and the initial parameters of the last linear layers in the causal temporal attention subblock and the decoupled spatial attention subblock are zero.

In an embodiment, training the to-be-trained model using the image embedding of the multiple initial video frames and the text embedding of the control texts corresponding to the multiple initial video frames, to obtain the video prediction model includes inputting the image embedding of the multiple initial video frames and the text embedding of the control texts corresponding to the multiple initial video frames into the to-be-trained model to obtain noised video frames, where the noised video frames include initial video frames with different noise levels; and denoising image embedding of the noised video frames through the to-be-trained model to obtain denoised video frames and determining the video prediction model according to the denoised video frames.

In an embodiment, the model determination module 403 further includes an embedding projection unit.

The embedding projection unit is configured to, before the to-be-trained model is trained using the image embedding of the multiple initial video frames and the text embedding of the control texts corresponding to the multiple initial video frames, to obtain the video prediction model, process the trajectory data using a Fourier embedding layer to obtain a high-dimensional trajectory embedding, and encode and project the high-dimensional trajectory embedding using a preset linear layer to obtain a projection embedding. The training of the embedding projection unit may be performed individually after the training of the video prediction model.

In an embodiment, the step of training the to-be-trained model using the image embedding of the multiple initial video frames and the text embedding of the control texts corresponding to the multiple initial video frames, to obtain the video prediction model includes training the to-be-trained model using the image embedding of the multiple initial video frames and text embedding of the text conditions corresponding to the multiple initial video frames, to obtain the video prediction model, where text embedding of the text conditions include text embedding of the scenario context and the vehicle movement instruction and the projection embedding.

In an embodiment, the video prediction model further includes a preset multi-layer neural network after a Transformer model, where the preset multi-layer neural network is configured to generate predicted trajectory points of the target vehicle corresponding to the predicted video frame according to a feature map outputted by the Transformer model. The training of this unit may be performed individually after the training of the video prediction model.

The apparatus for training an autonomous driving model according to the embodiment of the present disclosure may perform the method for training an autonomous driving model according to embodiment two or three of the present disclosure and has functional modules and beneficial effects corresponding to the performed method. Technical details that are not described in detail in this embodiment, reference may be made to the method according to embodiment two or three of the present disclosure above.

Embodiment Seven

Figure 13:
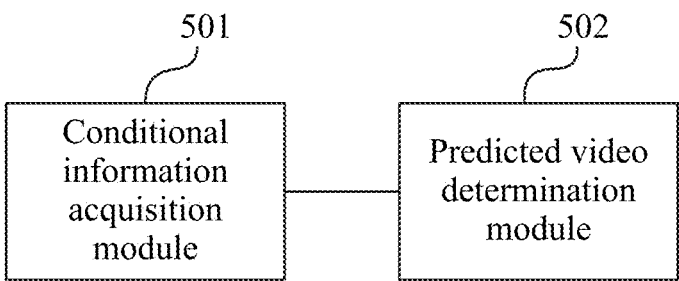
FIG. 13 is a structural diagram of a video prediction apparatus according to embodiment seven of the present disclosure.

FIG. 13 is a structural diagram of a video prediction apparatus according to embodiment seven of the present disclosure. As shown in FIG. 13, the apparatus includes a conditional information acquisition module 501 and a predicted video determination module 502.

The conditional information acquisition module 501 is configured to acquire at least one conditional video frame, a target scenario context, and a target movement instruction of a current vehicle, where the target scenario context is a scenario context of a current scenario corresponding to a conditional video frame of the at least one conditional video frame.

The predicted video determination module 502 is configured to input image embedding of the at least one conditional video frame and text embedding of text conditions into a preset video prediction model to obtain a predicted video, where the preset video prediction model is obtained by using the method for training an autonomous driving model according to embodiment two or three in which the autonomous driving model includes a video prediction model, and the text conditions includes the target scenario context and/or the target movement instruction.

In the video prediction apparatus provided in the embodiment of the present disclosure, the predicted video can be quickly and accurately obtained by inputting the image embedding of the conditional video frame and the text embedding of the corresponding text conditions into the model.

The video prediction apparatus according to the embodiment of the present disclosure may perform the video prediction method according to any embodiment of the present disclosure and has functional modules and beneficial effects corresponding to the performed method. Technical details that are not described in detail in this embodiment, reference may be made to the method according to embodiment four of the present disclosure above.

Embodiment Eight

Figure 14:
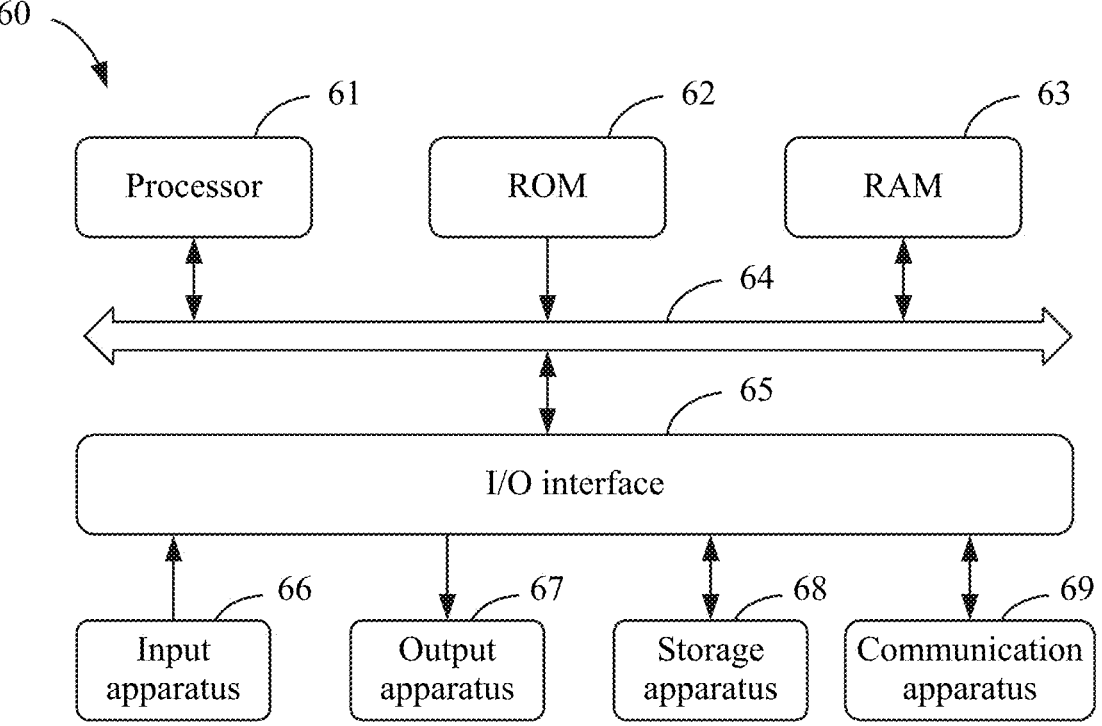
FIG. 14 is a structural diagram of an electronic device according to embodiment eight of the present disclosure.

FIG. 14 is a structural diagram of an electronic device 60 for implementing the embodiment of the present disclosure. The electronic device is intended to represent various forms of digital computers, for example, a laptop computer, a desktop computer, a worktable, a personal digital assistant, a server, a blade server, a mainframe computer, or another applicable computer. The electronic device may also represent various forms of mobile apparatuses, for example, a personal digital assistant, a cellphone, a smartphone, a wearable device (such as a helmet, glasses, and a watch), or another similar computing apparatus. Herein the shown components, the connections and relationships between these components, and the functions of these components are illustrative only and are not intended to limit the implementation of the present disclosure as described and/or claimed herein.

As shown in FIG. 14, the electronic device 60 includes at least one processor 61 and a memory (such as a read-only memory (ROM) 62 and a random-access memory (RAM)

63) communicatively connected to the at least one processor 61. The memory stores a computer program executable by the at least one processor. The processor 61 may perform various types of appropriate operations and processing according to a computer program stored in the ROM 62 or a computer program loaded from a storage apparatus 68 to the RAM 63. Various programs and data required for the operation of the electronic device 60 may also be stored in the RAM 63. The processor 61, the ROM 62, and the RAM 63 are connected to each other through a bus 64. An input/output (I/O) interface 65 is also connected to the bus 64.

Multiple components in the electronic device 60 are connected to the I/O interface 65. The multiple components include an input apparatus 66 such as a keyboard or a mouse, an output apparatus 67 such as various types of displays or speakers, the storage apparatus 68 such as a magnetic disk or an optical disk, and a communication apparatus 69 such as a network card, a modem, or a wireless communication transceiver. The communication apparatus 69 allows the electronic device 60 to exchange information/data with other devices over a computer network such as the Internet and/or various telecommunications networks.

The processor 61 may be various general-purpose and/or special-purpose processing components having processing and computing capabilities. Examples of the processor 61 include, but are not limited to, a central processing unit (CPU), a graphics processing unit (GPU), a special-purpose artificial intelligence (AI) computing chip, a processor executing machine learning models and algorithms, a digital signal processor (DSP), and any appropriate processor, controller, and microcontroller. The processor 61 performs various methods and processing described above, such as the method for training an autonomous driving model and/or the video prediction method.

In some embodiments, the method for training an autonomous driving model and/or the video prediction method may be implemented as computer programs tangibly contained in a computer-readable storage medium such as the storage apparatus 68. In some embodiments, part or all of computer programs may be loaded and/or installed onto the electronic device 60 via the ROM 62 and/or the communication apparatus 69. When the computer programs are loaded to the RAM 63 and executed by the processor 61, one or more steps of the preceding method for training an autonomous driving model and/or the preceding video prediction method may be performed. Alternatively, in other embodiments, the processor 61 may be configured, in any other suitable manner (for example, by means of firmware), to perform the method for training an autonomous driving model and/or the video prediction method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Computer programs for implementation of the methods of the present disclosure may be written in one programming language or any combination of multiple programming languages. These computer programs may be provided for a processor of a general-purpose computer, a special-purpose computer, or another programmable data processing apparatus such that the computer programs, when executed by the processor, cause functions/operations specified in the flowcharts and/or block diagrams to be implemented. These computer programs may be executed entirely on a machine, partly on a machine, as a stand-alone software package partly on a machine and partly on a remote machine, or entirely on a remote machine or a server.

The computer device provided above may be configured to perform the method for training an autonomous driving model and/or the video prediction method provided in any of the preceding embodiments and has corresponding functions and beneficial effects.

Embodiment Nine

In the context of the present disclosure, the computer-readable storage medium may be a tangible medium, and the computer-executable instructions, when executed by a computer processor, are configured to cause the computer processor to perform the method for training an autonomous driving model and/or the video prediction method.

In the case where an autonomous driving model includes a driving behavior prediction model and a driving trajectory prediction model, the method for training an autonomous driving model includes constructing a VQA network graph based on an autonomous driving data set and/or an autonomous driving simulator, where the VQA network graph includes an image frame and a QA network graph corresponding to the image frame, the QA network graph is composed of multiple nodes and directed edges among the multiple nodes, and each of the multiple nodes carries a Q&A pair; using the VQA network graph as a sample set and dividing the sample set into a training set and a test set; and training the driving behavior prediction model and the driving trajectory prediction model based on the training set and evaluating the driving behavior prediction model and the driving trajectory prediction model based on the test set.

In the case where an autonomous driving model includes a video prediction model, the method for training an autonomous driving model includes determining, according to an initial video frame collected by a target vehicle and/or scenario description metadata of the initial video frame, a scenario context of the initial video frame; determining a vehicle movement instruction of the target vehicle according to the initial video frame and/or trajectory data of the target vehicle corresponding to the initial video frame; and training an initial model using the initial video frame and a corresponding control text to obtain the video prediction model, where the control text includes the scenario context and the vehicle movement instruction, and the video prediction model is configured to output a predicted video frame.

The video prediction method includes acquiring at least one conditional video frame and determining a target scenario context of the conditional video frame using the conditional video frame and/or scenario description metadata of the conditional video frame; determining a target movement instruction of a current vehicle using the conditional video frame and/or trajectory data of the current vehicle corresponding to the conditional video frame; and inputting image embedding of the at least one conditional video frame and text embedding of text conditions into a preset video prediction model to obtain a predicted video, where the preset video prediction model is obtained by using the method for training an autonomous driving model in the case where the autonomous driving model includes the video prediction model, and the text conditions includes the target scenario context and/or the target movement instruction.

In the context of the present disclosure, the computer-readable storage medium may be a tangible medium including or storing a computer program that is used by or used in conjunction with an instruction execution system, apparatus, or device. The computer-readable storage medium may include, but is not limited to, an electronic, magnetic, optical, electromagnetic, infrared, or semiconductor system, apparatus, or device or any appropriate combination thereof. Alternatively, the computer-readable storage medium may be a machine-readable signal medium. Concrete examples of the machine-readable storage medium include an electrical connection based on one or more wires, a portable computer disk, a hard disk, a RAM, a ROM, an erasable programmable read-only memory (EPROM), a flash memory, an optical fiber, a portable compact disc read-only memory (CD-ROM), an optical storage device, a magnetic storage device, or any appropriate combination thereof.

The computer device provided above may be configured to perform the method for training an autonomous driving model and/or the video prediction method provided in any of the preceding embodiments and has corresponding functions and beneficial effects.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Computer programs for implementation of the methods of the present disclosure may be written in one programming language or any combination of multiple programming languages. These computer programs may be provided for a processor of a general-purpose computer, a special-purpose computer, or another programmable data processing apparatus such that the computer programs, when executed by the processor, cause functions/operations specified in the flowcharts and/or block diagrams to be implemented. These computer programs may be executed entirely on a machine, partly on a machine, as a stand-alone software package partly on a machine and partly on a remote machine, or entirely on a remote machine or a server.

In the context of the present disclosure, the computer-readable storage medium may be a tangible medium including or storing a computer program that is used by or used in conjunction with an instruction execution system, apparatus, or device. The computer-readable storage medium may include, but is not limited to, an electronic, magnetic, optical, electromagnetic, infrared, or semiconductor system, apparatus, or device or any appropriate combination thereof. Alternatively, the computer-readable storage medium may be a machine-readable signal medium. Concrete examples of the machine-readable storage medium include an electrical connection based on one or more wires, a portable computer disk, a hard disk, a RAM, a ROM, an erasable programmable read-only memory (EPROM), a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on the electronic device. The electronic device has a display device (for example, a cathode-ray tube (CRT) or a liquid-crystal display (LCD) monitor) for displaying information to the user; and a keyboard and a pointing device (for example, a mouse or a trackball) through which the user can provide input for the electronic device. Other types of apparatuses may also be used for providing interaction with a user. For example, feedback provided for the user may be sensory feedback in any form (for example, visual feedback, auditory feedback, or tactile feedback); and input from the user may be received in any form (including acoustic input, voice input, or tactile input).

The systems and techniques described herein may be implemented in a computing system including a back-end component (for example, a data server), a computing system including a middleware component (for example, an application server), a computing system including a front-end component (for example, a user computer having a graphical user interface or a web browser through which a user can interact with embodiments of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related virtual private server (VPS).

It is to be understood that various forms of the preceding flows may be used with steps reordered, added, or deleted. For example, the steps described in the present disclosure may be performed in parallel, in sequence, or in a different order as long as the desired result of the technical solutions provided in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement, and the like made within the principle of the present disclosure fall within the scope of the present disclosure.

What is claimed is:

1. A method for training an autonomous driving model, wherein the autonomous driving model comprises a driving behavior prediction model and a driving trajectory prediction model, and the method comprises:

constructing a visual question answering (VQA) network graph based on at least one of an autonomous driving data set or an autonomous driving simulator, wherein the VQA network graph comprises an image frame and a QA network graph corresponding to the image frame, the QA network graph is composed of a plurality of nodes and directed edges among the plurality of nodes, and each of the plurality of nodes carries a question-and-answer (Q&A) pair;

using the VQA network graph as a sample set and dividing the sample set into a training set and a test set; and training the driving behavior prediction model and the driving trajectory prediction model based on the training set and evaluating the driving behavior prediction model and the driving trajectory prediction model based on the test set, wherein the Q&A pair comprises a question sentence and a real answering sentence, the VQA network graph also carries a real driving behavior and a real driving trajectory corresponding to the image frame, and the real driving behavior comprises a real driving speed and a real steering angle, and wherein training the driving behavior prediction model based on the training set comprises:

traversing the plurality of nodes in sequence according to logical dependencies among the plurality of nodes in the VQA network graph until all the plurality of nodes are traversed; in response to that a node of the plurality of nodes traversed has a predecessor node, inputting the image frame and a question sentence of the node into the driving behavior prediction model and outputting a predicted answering sentence of the node, and in response to that a node of the plurality of nodes traversed has a predecessor node, inputting a Q&A pair of the predecessor node and a question sentence of the node into the driving behavior prediction model and outputting a predicted answering sentence of the node;

inputting Q&A pairs of all the plurality of nodes in the VQA network graph into the driving behavior prediction model and outputting a predicted driving behavior; and training the driving behavior prediction model based on predicted answering sentences of the plurality of nodes, real answering sentences of the plurality of nodes, the predicted driving behavior, and the real driving behavior.

2. The method of claim 1, wherein constructing the VQA network graph based on the autonomous driving data set comprises:

extracting a key frame from a driving video of the autonomous driving data set;

extracting at least one key object from the key frame;

adding a plurality of Q&A pairs in a reasoning stage for each of the at least one key object, wherein the reasoning stage comprises at least one of a perception stage, a prediction stage, or a planning stage; and adding the directed edges among the plurality of Q&A pairs based on Q&A pairs logical dependencies among the plurality of Q&A pairs to obtain the QA network graph corresponding to the key frame and adding a two-dimensional (2D) bounding box for a key object of the at least one key object in the key frame.

3. The method of claim 1, wherein constructing the VQA network graph based on the autonomous driving simulator comprises:

creating a virtual vehicle and a virtual scenario based on the autonomous driving simulator;

controlling the virtual vehicle to drive in the virtual scenario and collecting driving-related data of the virtual vehicle during driving;

based on the driving-related data, constructing a plurality of Q&A pairs in a reasoning stage corresponding to the image frame; and adding the directed edges among the plurality of Q&A pairs based on logical dependencies among the plurality of Q&A pairs to obtain the QA network graph corresponding to the image frame.

4. The method of claim 1, wherein training the driving trajectory prediction model based on the training set comprises:

inputting the image frame of the VQA network graph, Q&A pairs of all the plurality of nodes, and the real driving behavior into the driving trajectory prediction model and outputting a predicted driving trajectory; and training the driving trajectory prediction model based on the predicted driving trajectory and the real driving trajectory.

5. The method of claim 1, wherein evaluating the driving behavior prediction model based on the test set comprises:

traversing the plurality of nodes in sequence according to logical dependencies among the plurality of nodes in the VQA network graph until all the plurality of nodes are traversed; in response to that a node of the plurality of nodes traversed do not have a predecessor node, inputting the image frame and a question sentences of the node into the driving behavior prediction model trained and outputting a predicted answering sentence of the node, and in response to that a node of the plurality of traversed nodes has a predecessor node, inputting a Q&A pair of the predecessor node and a question sentence of the node into the driving behavior prediction model trained and outputting a predicted answering sentence of the node;

inputting Q&A pairs of all the plurality of nodes in the VQA network graph into the driving behavior prediction model trained and outputting a predicted driving behavior; and evaluating predicted answering sentences of the plurality of nodes based on real answering sentences of the plurality of nodes to obtain a QA evaluation metrics, and evaluating the predicted driving behavior based on the real driving behavior to obtain an accuracy evaluation metrics, wherein the accuracy evaluation metrics comprises a speed accuracy evaluation metrics and a steering angle accuracy evaluation metrics.

6. The method of claim 1, wherein evaluating the driving trajectory prediction model based on the test set comprises:

inputting Q&A pairs of all the plurality of nodes in the VQA network graph and the real driving behavior into the driving trajectory prediction model trained and outputting a predicted driving trajectory; and evaluating the predicted driving trajectory based on the real driving trajectory to obtain an error evaluation metrics, wherein the error evaluation metrics comprises an average displacement error evaluation metrics and a final displacement error evaluation metrics.

7. The method of claim 1, wherein after the driving behavior prediction model and the driving trajectory prediction model are evaluated based on the test set, the method further comprises:

acquiring a target image frame and a plurality of question sentences, wherein the plurality of question sentences have a logical relationship;

inputting the target image frame and the plurality of question sentences into the driving behavior prediction model in sequence according to the logical relationship to obtain a target driving behavior and a plurality of answering sentences of the plurality of question sentences, wherein the plurality of question sentences and the plurality of answering sentences compose a plurality of Q&A pairs; and inputting the target image frame, the plurality of Q&A pairs, and the target driving behavior into the driving trajectory prediction model and outputting a target driving trajectory corresponding to the target image frame.

8. An electronic device, comprising:

at least one processor; and a memory communicatively connected to the at least one processor; wherein the memory stores a computer program executable by the at least one processor to cause the at least one processor to perform a method for training an autonomous driving model;

wherein the autonomous driving model comprises a driving behavior prediction model and a driving trajectory prediction model, and the method comprises:

constructing a visual question answering (VQA) network graph based on at least one of an autonomous driving data set or an autonomous driving simulator, wherein the VQA network graph comprises an image frame and a QA network graph corresponding to the image frame, the QA network graph is composed of a plurality of nodes and directed edges among the plurality of nodes, and each of the plurality of nodes carries a question-and-answer (Q&A) pair;

using the VQA network graph as a sample set and dividing the sample set into a training set and a test set; and training the driving behavior prediction model and the driving trajectory prediction model based on the training set and evaluating the driving behavior prediction model and the driving trajectory prediction model based on the test set, wherein the Q&A pair comprises a question sentence and a real answering sentence, the VQA network graph also carries a real driving behavior and a real driving trajectory corresponding to the image frame, and the real driving behavior comprises a real driving speed and a real steering angle, and wherein training the driving behavior prediction model based on the training set comprises:

traversing the plurality of nodes in sequence according to logical dependencies among the plurality of nodes in the VQA network graph until all the plurality of nodes are traversed; in response to that a node of the plurality of nodes traversed has a predecessor node, inputting the image frame and a question sentence of the node into the driving behavior prediction model and outputting a predicted answering sentence of the node, and in response to that a node of the plurality of nodes traversed has a predecessor node, inputting a Q&A pair of the predecessor node and a question sentence of the node into the driving behavior prediction model and outputting a predicted answering sentence of the node;

inputting Q&A pairs of all the plurality of nodes in the VQA network graph into the driving behavior prediction model and outputting a predicted driving behavior; and training the driving behavior prediction model based on predicted answering sentences of the plurality of nodes, real answering sentences of the plurality of nodes, the predicted driving behavior, and the real driving behavior.

9. The electronic device according to claim 8, wherein constructing the VQA network graph based on the autonomous driving data set comprises:

extracting a key frame from a driving video of the autonomous driving data set;

extracting at least one key object from the key frame;

adding a plurality of Q&A pairs in a reasoning stage for each of the at least one key object, wherein the reasoning stage comprises at least one of a perception stage, a prediction stage, or a planning stage; and adding the directed edges among the plurality of Q&A pairs based on Q&A pairs logical dependencies among the plurality of Q&A pairs to obtain the QA network graph corresponding to the key frame and adding a two-dimensional (2D) bounding box for a key object of the at least one key object in the key frame.

10. The electronic device according to claim 8, wherein constructing the VQA network graph based on the autonomous driving simulator comprises:

creating a virtual vehicle and a virtual scenario based on the autonomous driving simulator;

controlling the virtual vehicle to drive in the virtual scenario and collecting driving-related data of the virtual vehicle during driving;

based on the driving-related data, constructing a plurality of Q&A pairs in a reasoning stage corresponding to the image frame; and adding the directed edges among the plurality of Q&A pairs based on logical dependencies among the plurality of Q&A pairs to obtain the QA network graph corresponding to the image frame.

11. The electronic device according to claim 8, wherein training the driving trajectory prediction model based on the training set comprises:

inputting the image frame of the VQA network graph, Q&A pairs of all the plurality of nodes, and the real driving behavior into the driving trajectory prediction model and outputting a predicted driving trajectory; and training the driving trajectory prediction model based on the predicted driving trajectory and the real driving trajectory.

12. The electronic device according to claim 8, wherein evaluating the driving behavior prediction model based on the test set comprises:

traversing the plurality of nodes in sequence according to logical dependencies among the plurality of nodes in the VQA network graph until all the plurality of nodes are traversed; in response to that a node of the plurality of nodes traversed do not have a predecessor node, inputting the image frame and a question sentences of the node into the driving behavior prediction model trained and outputting a predicted answering sentence of the node, and in response to that a node of the plurality of traversed nodes has a predecessor node, inputting a Q&A pair of the predecessor node and a question sentence of the node into the driving behavior prediction model trained and outputting a predicted answering sentence of the node;

inputting Q&A pairs of all the plurality of nodes in the VQA network graph into the driving behavior prediction model trained and outputting a predicted driving behavior; and evaluating predicted answering sentences of the plurality of nodes based on real answering sentences of the plurality of nodes to obtain a QA evaluation metrics, and evaluating the predicted driving behavior based on the real driving behavior to obtain an accuracy evaluation metrics, wherein the accuracy evaluation metrics comprises a speed accuracy evaluation metrics and a steering angle accuracy evaluation metrics.

13. The electronic device according to claim 8, wherein evaluating the driving trajectory prediction model based on the test set comprises:

inputting Q&A pairs of all the plurality of nodes in the VQA network graph and the real driving behavior into the driving trajectory prediction model trained and outputting a predicted driving trajectory; and evaluating the predicted driving trajectory based on the real driving trajectory to obtain an error evaluation metrics, wherein the error evaluation metrics comprises an average displacement error evaluation metrics and a final displacement error evaluation metrics.

14. The electronic device according to claim 8, wherein after the driving behavior prediction model and the driving trajectory prediction model are evaluated based on the test set, the method further comprises:

acquiring a target image frame and a plurality of question sentences, wherein the plurality of question sentences have a logical relationship;

inputting the target image frame and the plurality of question sentences into the driving behavior prediction model in sequence according to the logical relationship to obtain a target driving behavior and a plurality of answering sentences of the plurality of question sentences, wherein the plurality of question sentences and the plurality of answering sentences compose a plurality of Q&A pairs; and inputting the target image frame, the plurality of Q&A pairs, and the target driving behavior into the driving trajectory prediction model and outputting a target driving trajectory corresponding to the target image frame.

15. A non-transitory computer-readable storage medium storing computer instructions configured to, when executed by a processor, cause the processor to perform a method for training an autonomous driving model;

wherein the autonomous driving model comprises a driving behavior prediction model and a driving trajectory prediction model, and the method comprises:

constructing a visual question answering (VQA) network graph based on at least one of an autonomous driving data set or an autonomous driving simulator, wherein the VQA network graph comprises an image frame and a QA network graph corresponding to the image frame, the QA network graph is composed of a plurality of nodes and directed edges among the plurality of nodes, and each of the plurality of nodes carries a question-and-answer (Q&A) pair;

using the VQA network graph as a sample set and dividing the sample set into a training set and a test set; and training the driving behavior prediction model and the driving trajectory prediction model based on the training set and evaluating the driving behavior prediction model and the driving trajectory prediction model based on the test set, wherein the Q&A pair comprises a question sentence and a real answering sentence, the VQA network graph also carries a real driving behavior and a real driving trajectory corresponding to the image frame, and the real driving behavior comprises a real driving speed and a real steering angle, and wherein training the driving behavior prediction model based on the training set comprises:

traversing the plurality of nodes in sequence according to logical dependencies among the plurality of nodes in the VQA network graph until all the plurality of nodes are traversed; in response to that a node of the plurality of nodes traversed has a predecessor node, inputting the image frame and a question sentence of the node into the driving behavior prediction model and outputting a predicted answering sentence of the node, and in response to that a node of the plurality of nodes traversed has a predecessor node, inputting a Q&A pair of the predecessor node and a question sentence of the node into the driving behavior prediction model and outputting a predicted answering sentence of the node;

inputting Q&A pairs of all the plurality of nodes in the VQA network graph into the driving behavior prediction model and outputting a predicted driving behavior; and training the driving behavior prediction model based on predicted answering sentences of the plurality of nodes, real answering sentences of the plurality of nodes, the predicted driving behavior, and the real driving behavior.

16. The non-transitory computer-readable storage medium according to claim 15, wherein constructing the VQA network graph based on the autonomous driving data set comprises:

extracting a key frame from a driving video of the autonomous driving data set;

extracting at least one key object from the key frame;

adding a plurality of Q&A pairs in a reasoning stage for each of the at least one key object, wherein the reasoning stage comprises at least one of a perception stage, a prediction stage, or a planning stage; and adding the directed edges among the plurality of Q&A pairs based on Q&A pairs logical dependencies among the plurality of Q&A pairs to obtain the QA network graph corresponding to the key frame and adding a two-dimensional (2D) bounding box for a key object of the at least one key object in the key frame.

17. The non-transitory computer-readable storage medium according to claim 15, wherein constructing the VQA network graph based on the autonomous driving simulator comprises:

creating a virtual vehicle and a virtual scenario based on the autonomous driving simulator;

controlling the virtual vehicle to drive in the virtual scenario and collecting driving-related data of the virtual vehicle during driving;

based on the driving-related data, constructing a plurality of Q&A pairs in a reasoning stage corresponding to the image frame; and adding the directed edges among the plurality of Q&A pairs based on logical dependencies among the plurality of Q&A pairs to obtain the QA network graph corresponding to the image frame.

18. The non-transitory computer-readable storage medium according to claim 15, wherein training the driving trajectory prediction model based on the training set comprises:

inputting the image frame of the VQA network graph, Q&A pairs of all the plurality of nodes, and the real driving behavior into the driving trajectory prediction model and outputting a predicted driving trajectory; and training the driving trajectory prediction model based on the predicted driving trajectory and the real driving trajectory.

19. The non-transitory computer-readable storage medium according to claim 15, wherein evaluating the driving behavior prediction model based on the test set comprises:

traversing the plurality of nodes in sequence according to logical dependencies among the plurality of nodes in the VQA network graph until all the plurality of nodes are traversed; in response to that a node of the plurality of nodes traversed do not have a predecessor node, inputting the image frame and a question sentences of the node into the driving behavior prediction model trained and outputting a predicted answering sentence of the node, and in response to that a node of the plurality of traversed nodes has a predecessor node, inputting a Q&A pair of the predecessor node and a question sentence of the node into the driving behavior prediction model trained and outputting a predicted answering sentence of the node;

inputting Q&A pairs of all the plurality of nodes in the VQA network graph into the driving behavior prediction model trained and outputting a predicted driving behavior; and evaluating predicted answering sentences of the plurality of nodes based on real answering sentences of the plurality of nodes to obtain a QA evaluation metrics, and evaluating the predicted driving behavior based on the real driving behavior to obtain an accuracy evaluation metrics, wherein the accuracy evaluation metrics comprises a speed accuracy evaluation metrics and a steering angle accuracy evaluation metrics.

20. The non-transitory computer-readable storage medium according to claim 15, wherein evaluating the driving trajectory prediction model based on the test set comprises:

inputting Q&A pairs of all the plurality of nodes in the VQA network graph and the real driving behavior into the driving trajectory prediction model trained and outputting a predicted driving trajectory; and evaluating the predicted driving trajectory based on the real driving trajectory to obtain an error evaluation metrics, wherein the error evaluation metrics comprises an average displacement error evaluation metrics and a final displacement error evaluation metrics.

* * * * *